April 10, 1956 C. B. DALE ET AL 2,741,439

MAGNETIC TAPE RECORDER

Filed Oct. 29, 1951 10 Sheets-Sheet 1

INVENTORS
Colin B. Dale, Paul K. Bridenbaugh
Raymond C. Bierman
BY
Paul Kolisch
ATTORNEY April 10, 1956 C. B. DALE ET AL 2,741,439

MAGNETIC TAPE RECORDER

Filed Oct. 29, 1951 10 Sheets-Sheet 2

INVENTORS
Colin B. Dale, Paul K. Bridenbaugh
Raymond C. Bierman
BY Paul Kolisch
ATTORNEY INVENTORS
Colin B. Dale, Paul K. Bridenbaugh
Raymond C. Bierman
BY Paul Holisch
ATTORNEY

MAGNETIC TAPE RECORDER

Filed Oct. 29, 1951

10 Sheets-Sheet 4

Colin B. Dale, Paul K. Bridenbaugh, Raymond C. Bierman
INVENTORS
BY Paul Kolisch
ATTORNEY April 10, 1956 C. B. DALE ET AL 2,741,439

MAGNETIC TAPE RECORDER

Filed Oct. 29, 1951 10 Sheets-Sheet 5

INVENTORS
Colin B. Dale, Paul K. Bridenbaugh, Raymond C. Bierman

BY Paul Kolisch

ATTORNEY

INVENTORS
Colin B. Dale, Paul K. Bridenbaugh
Raymond C. Bierman
BY
Paul Kolisch
ATTORNEY Colin B. Dale, Paul K. Bridenbaugh, Raymond C. Bigrnson
INVENTORS
BY Paul Kolisch
ATTORNEY

MAGNETIC TAPE RECORDER

Filed Oct. 29, 1951 10 Sheets-Sheet 8

INVENTORS
Colin B. Dale, Paul K. Bridenbaugh,
Raymond C. Biersman
BY Paul Koliach
ATTORNEY Colin B. Dale, Paul K. Bridenbaugh, Raymond C. Bierman
INVENTORS
BY Paul Kolisch
ATTORNEY INVENTORS
Colin B. Dale, Paul K. Bridenbaugh, Raymond C. Bierman
BY Paul Kolisch
ATTORNEY United States Patent Office 2,741,439
Patented Apr. 10, 1956

2,741,439

MAGNETIC TAPE RECORDER

Colin B. Dale, Oak Park, Paul K. Bridenbaugh, Chicago, and Raymond C. Bierman, Clarendon Hills, Ill., assignors to Webster-Chicago Corporation, Chicago, Ill., a corporation of Illinois Application October 29, 1951, Serial No. 253,678

13 Claims. (Cl. 242—55)

This invention relates to magnetic or like recorders and particularly to magnetic tape recorders.

An object of this invention is to provide a novel two-way magnetic recorder in which the magnetizable medium may be fed alternatively in opposite directions for recording and reproducing runs.

In relation to magnetic recorders using a magnetizable tape, the invention contemplates the provision of built-in structure to enable use of two record paths on the tape. In known magnetic tape recorders, recording and reproducing is effected with the tape traveling in only one direction and, in order to record two record paths on the tape, it was necessary to remove the reels from the machine and replace them in reverse order. According to the present invention, the use of two record paths on the tape is provided for without requiring reversal of the positions of the reels, so that recording and reproducing from either of two record paths is made possible while the reels remain in the same positions on the machine.

More specifically, the invention is featured by the provision of transducer means having two magnetic heads, alternatively operable in consonance with alternative directions of the tape travel, one magnetic head being effective to record on or reproduce from one record track of the tape while the tape travels in one direction and the other magnetic head being similarly effective while the tape travels in the opposite direction.

According to the invention, means are provided to jointly select the direction of travel of the tape and the proper magnetic head to function during the selected direction of travel.

Each magnetic head also includes an erase magnet to erase a previous recording of a sound track and prepare the track to receive a new recording by operation of the record magnet in the same head. According to the invention, the erase and record magnets of one or the other head will be selected for operation in accordance with the selected direction of travel of the tape. More specifically, the invention provides a common record control which conditions the machine for erasing and recording operation, and a feed direction selector which operates in conjunction with the common record control for rendering operable the erase and record magnets of one of the heads in accordance with the selected feed direction.

A feature of the invention is the provision of a pair of pressure means, one pressure means operable to press the tape in intimate contact with the magnetic gaps in one head and the other pressure means similarly operable in conjunction with the other head. According to the invention, one or the other of these pressure means will be brought into operation depending on the selection of a magnetic head for operation which, in turn, depends on the selection of the direction of tape travel.

Another object of the invention is the provision of means to insure uniform rate of travel of the record medium from one reel to the other during a recording or reproducing run. One difficulty in obtaining uniform rate of travel of the medium is the changing diameters of the record medium on the reels as the run proceeds. Such changing diameters impose varying torques on the drive means for the record medium and the consequent varying load requirement imposed on the drive means would result in speed fluctuations of the record medium. According to the present invention, means are provided to overcome this difficulty and to feed the record medium positively at a uniform rate from one reel to the other regardless of the diameters of the record medium on the reel. More specifically the invention provides means for feeding the record medium from one reel at uniform speed across a transducer station while permitting the other reel to take up or wind up the record medium at a suitable speed which may vary according to the diameter of the medium on the take-up reel without affecting the uniform speed at which the medium is fed from the other reel.

More specifically, the invention is featured by drive means operated at uniform speed to feed the record medium from one reel across an operating station and separate, torque-segregated means for winding up the record medium on the other reel, with the winding or take-up drive means having no influence on the load requirements of the drive means for effecting the tape feed.

Still more specifically, the invention contemplates the provision of separate motors, one for supplying the power to feed the record medium and the other for supplying the power to effect the take-up of the medium.

According to the invention, the tape feed drive motor operates a feed device, referred to as a capstan for feeding the record medium from one reel across an operating station while the take-up motor will turn the take-up reel to receive the record medium after being operated on. Further, according to the invention the take-up motor operates as a reduced torque drive device which delivers to the receiving reel sufficient power to wind up the medium while rotating at a slow speed, the motor driving the take-up reel as rapidly as the capstan feeds it past the operating station.

In relation to the two-way aspect of the recorder, an object of the invention is to provide two drives alternately to function as a feed drive and a take-up drive depending on the selected direction of feed of the medium. More specifically, according to the invention two motors are provided, one of which is effective to serve for driving a capstan means for feeding the record medium in one direction, and the other of which is effective to drive a take-up reel at reduced speed, the functions of the motors being reversed during feed of the medium in the opposite direction.

Another object of the invention is to provide simplified memory brakes for selectively braking the reels upon setting the machine to a neutral or stop position. Such memory brakes will function to brake the reel from which the record medium has been feeding prior to the return of the machine to neutral position. The neutral position is the same regardless of whether the machine has been set to feed the medium from one reel or the other. The memory brakes will "remember" the direction of feed when the machine is returned to neutral condition and will brake the proper one of the reels.

Another object of the invention is to provide means for rewinding the record medium on a reel at increased speed. According to the invention, the recorder is provided with a pressure roller for coacting with a feed roller to feed the record medium during a recording or reproducing run. The invention contemplates the provision of means for relieving the pressure of the pressure roller against the feed roller during high speed rewind operation. Further, the take-up motor will be conditioned during such high speed operation to operate at maximum power.

Still further, according to the invention, the pressure pads for pressing the record medium against the magnetic head or heads will be in disabled positions during the high speed rewind operation.

Another object of the invention is the provision of novel means for feeding the record medium at high or low speed during a recording or reproducing run.

According to the invention, the motors will be in fixed positions and their shafts will be provided with drive portions of different diameters. Idler wheels will be provided between the motor shafts and the capstan and one or the other of the idler wheels will be moved into drive communicating position between a motor and the capstan in accordance with the selected direction of tape travel. A feature of the invention is the mounting of the idler wheels for travel in a path which results in the selected idler wheel engaging the rotating motor shaft before engaging the capstan. The idler wheel will thus be set in rotation just prior to its engaging the capstan. In this way, the friction between the idler wheel and the capstan will be reduced, the engagement being in effect a rolling engagement. In this way, wear of the idler wheel, preferably formed with a rubber rim, will be reduced.

According to the invention, the reel spindles are mounted on carriers selectively movable towards the drive elements for enabling engagement of a driven wheel, about the spindle, with a drive element so as to rotate the reel on the selected carrier for taking up the tape, the selection of the carrier to be moved toward the associated drive element being determined by the selection of the direction in which the tape is to be transported.

A feature of the invention is that the reel carrier is provided with a brake drum rotatable with the driven wheel on the carrier and the latter also pivotally carrying the brake lever to engage the brake drum upon relative movement with respect to the carrier upon the stopping of tape feed from the reel on the carrier.

Another object of the invention is the provision of novel stop means for the recorder to act upon the record medium reaching its end on a reel.

It is to be understood that certain features of the invention have broader application than to magnetic recorders and may be applied to other types of recorders. One such feature is the provision of a pair of recorder devices to selectively function according to the direction of feed of the record medium.

Other objects of the invention will appear from the accompanying drawings, claims, and detailed description, in which:

Figure 1:
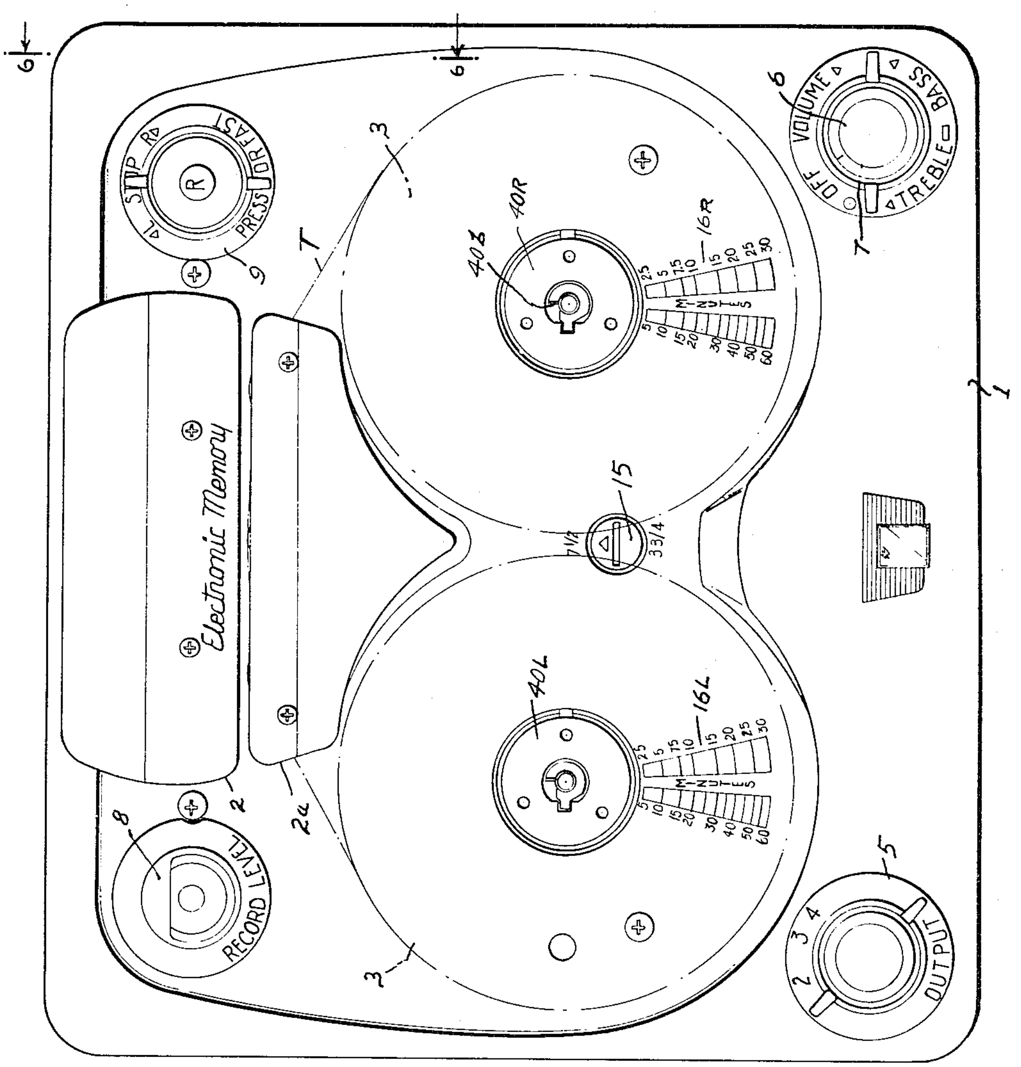
Fig. 1 is an outside plan view of the recorder.
Figure 2:
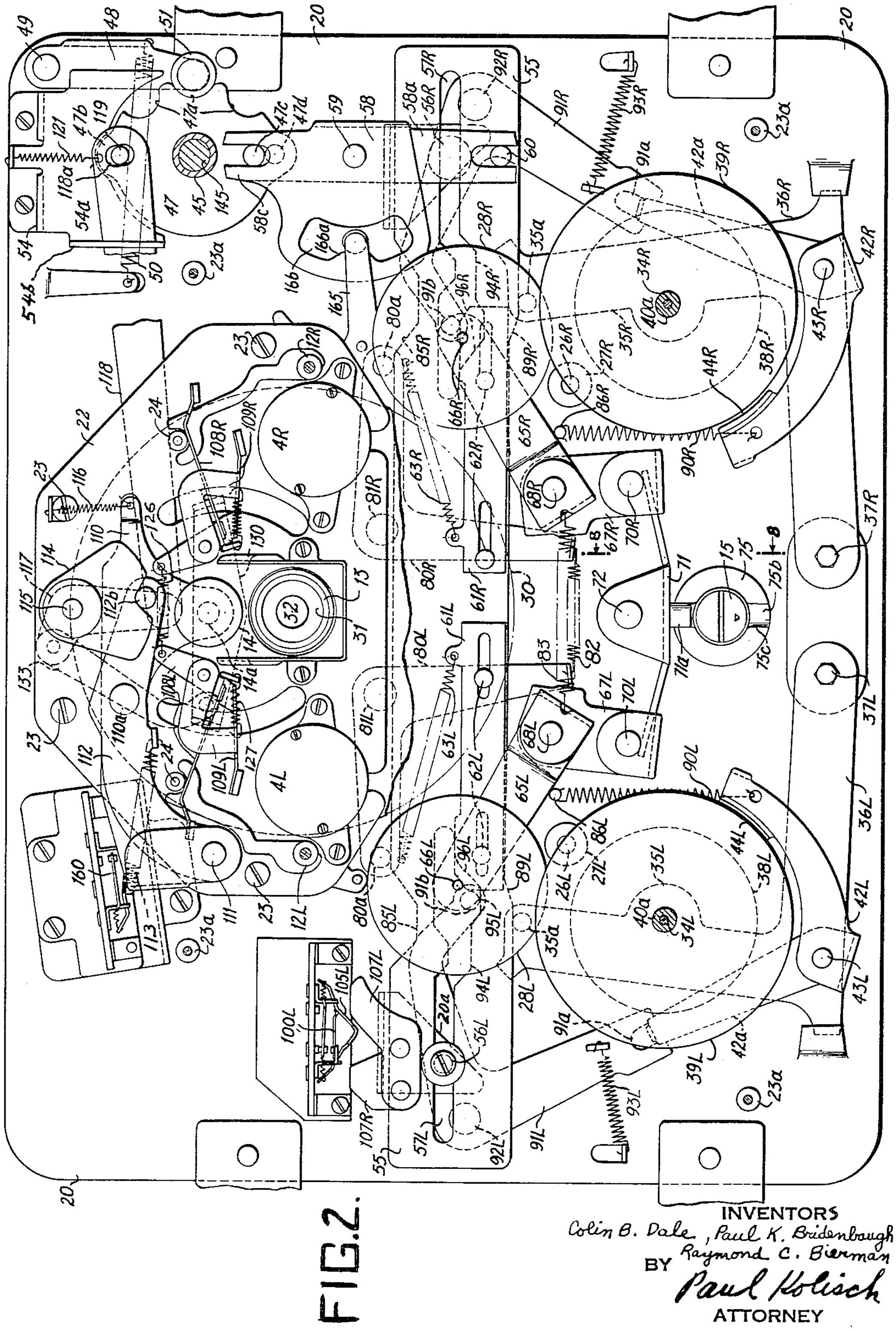
Fig. 2 is a plan view of the interior mechanism, the cover plates being removed and the mechanism being shown in the idle or neutral position.
Figure 3:
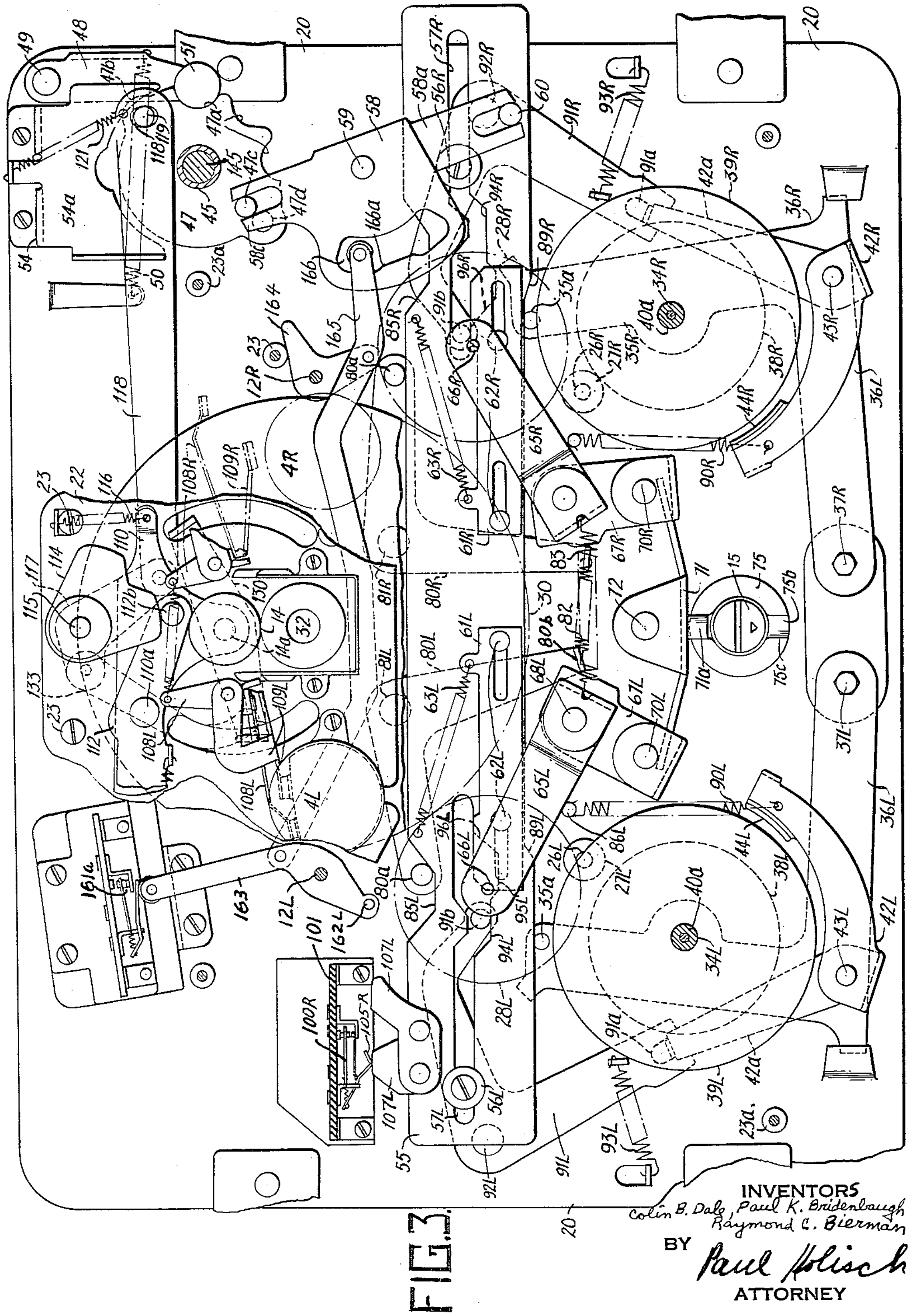
Fig. 3 is a plan view showing the interior mechanism adjusted for tape feed to the right.
Figures 4, 4A:
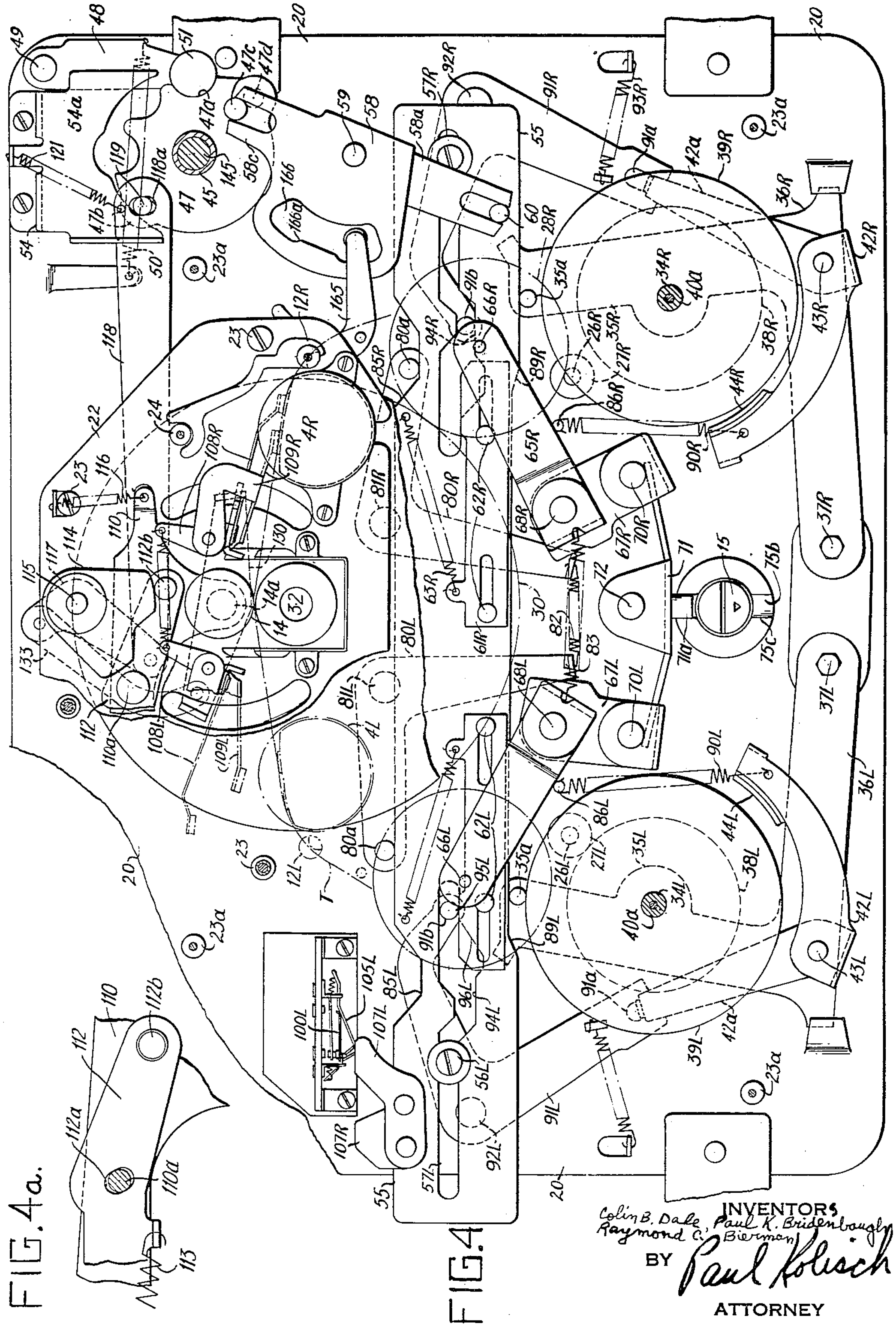
Fig. 4 is a similar plan view but showing the mechanism adjusted to feed the tape to the left.
Figures 5, 5A, 5B, 5C:
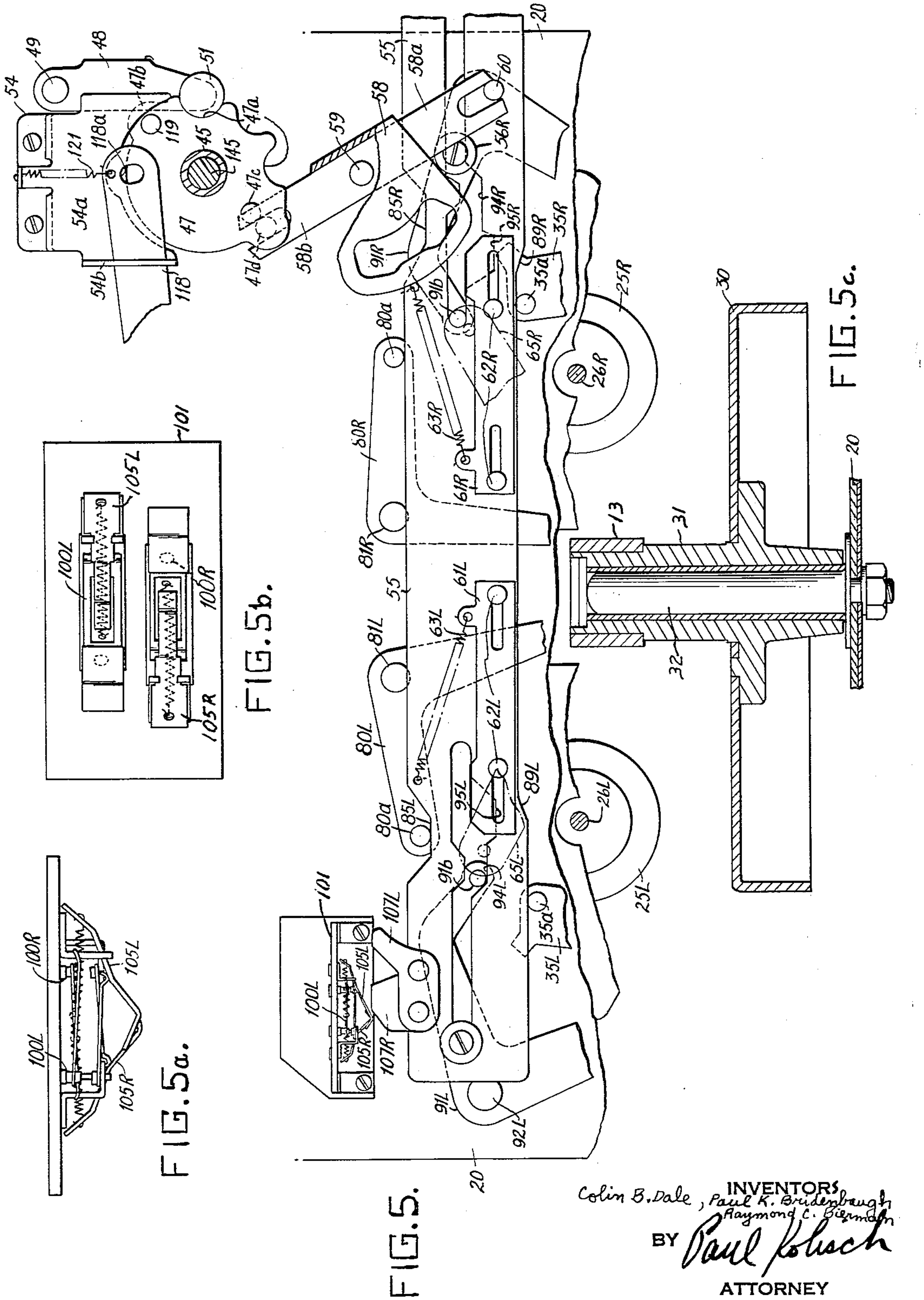
Figure 6:
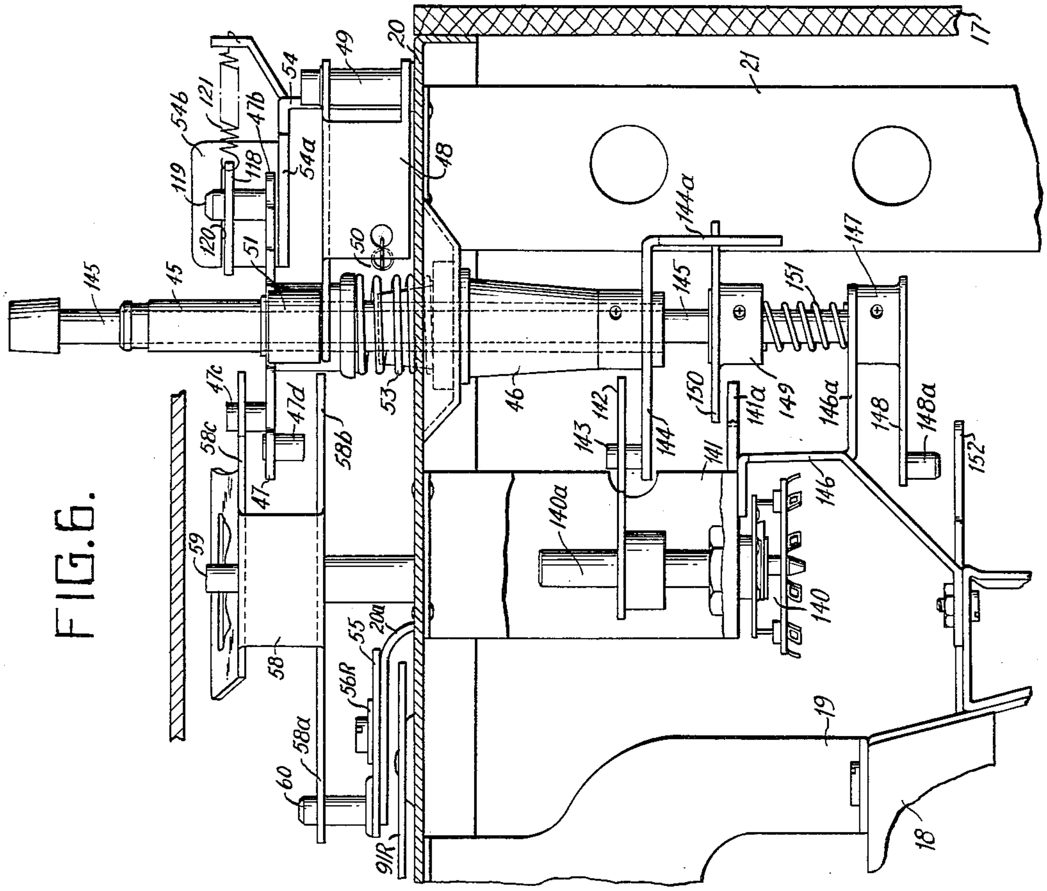
Figure 7:
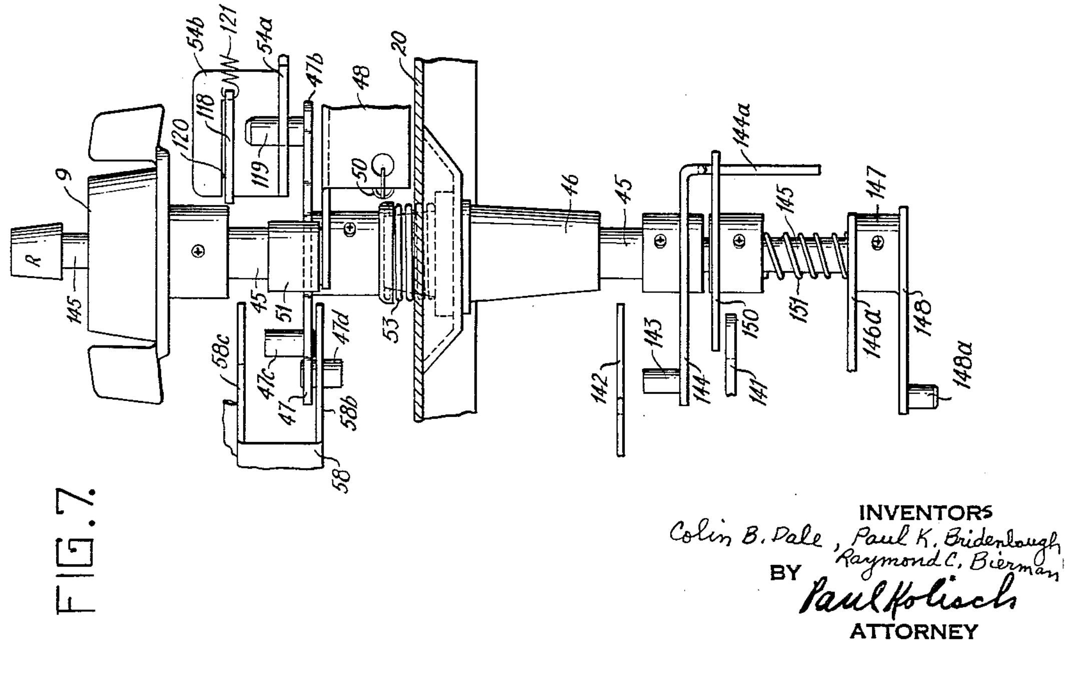
Figures 8, 9, 10, 11:
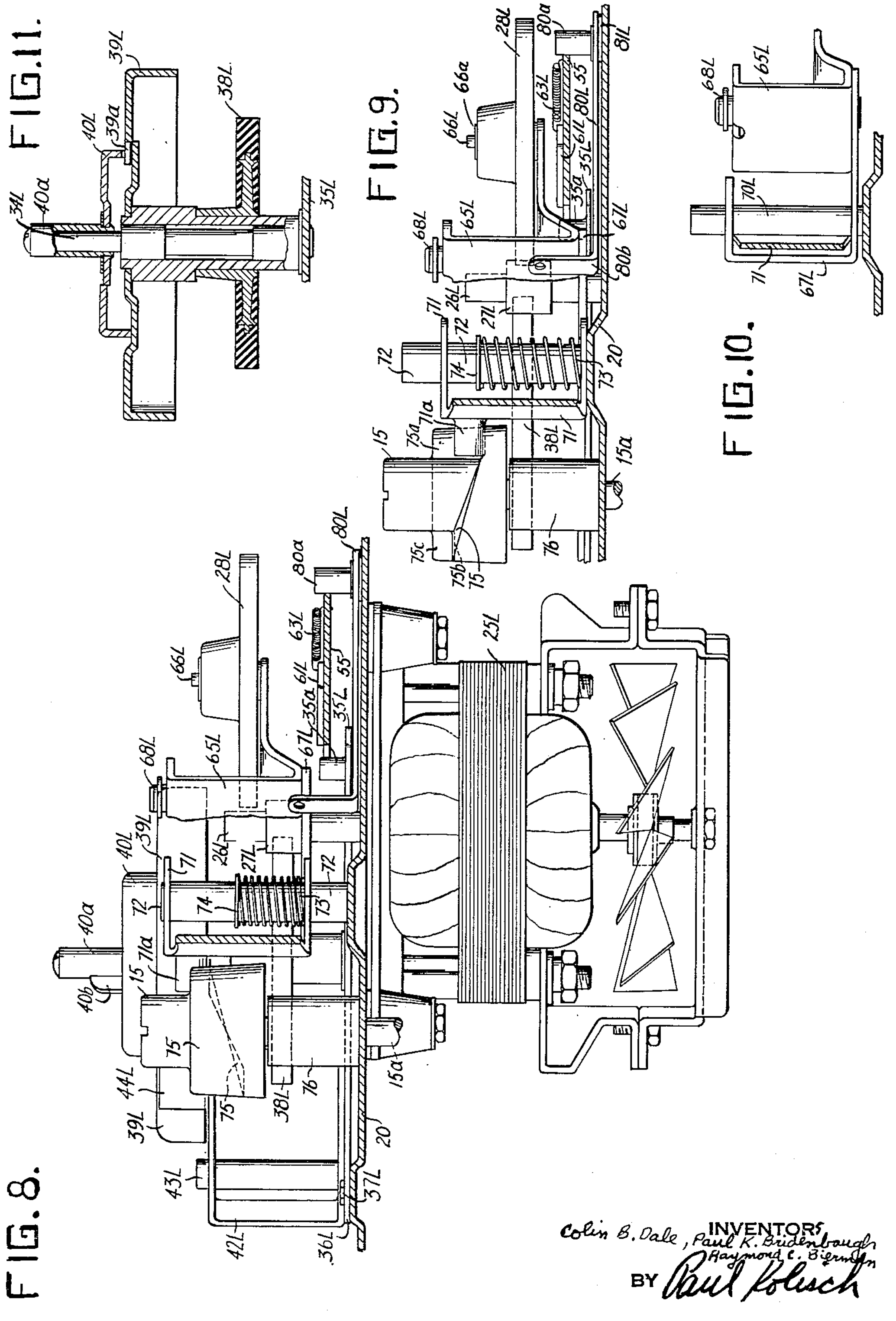
Figures 12, 14, 14A:
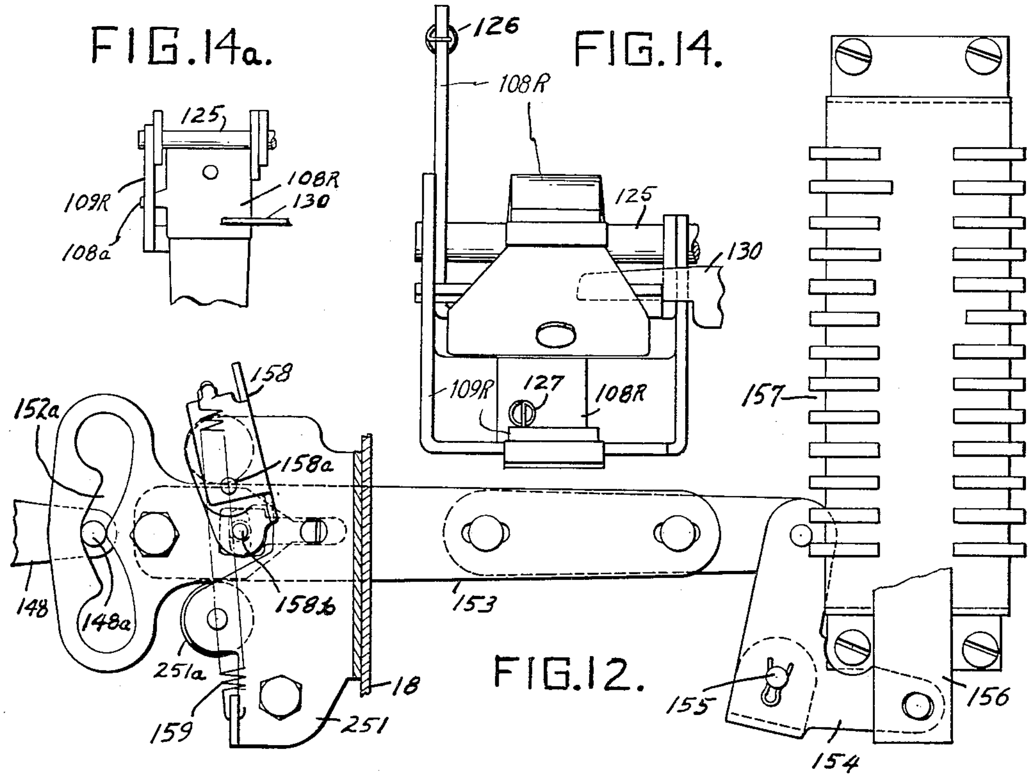
Figure 13:
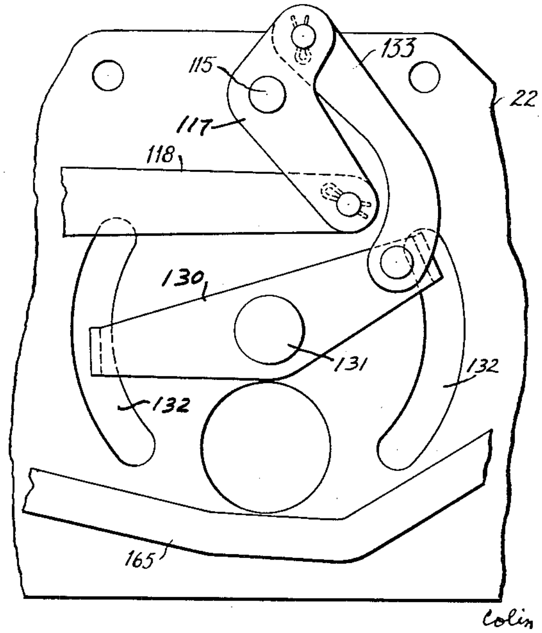
Figures 15, 16:
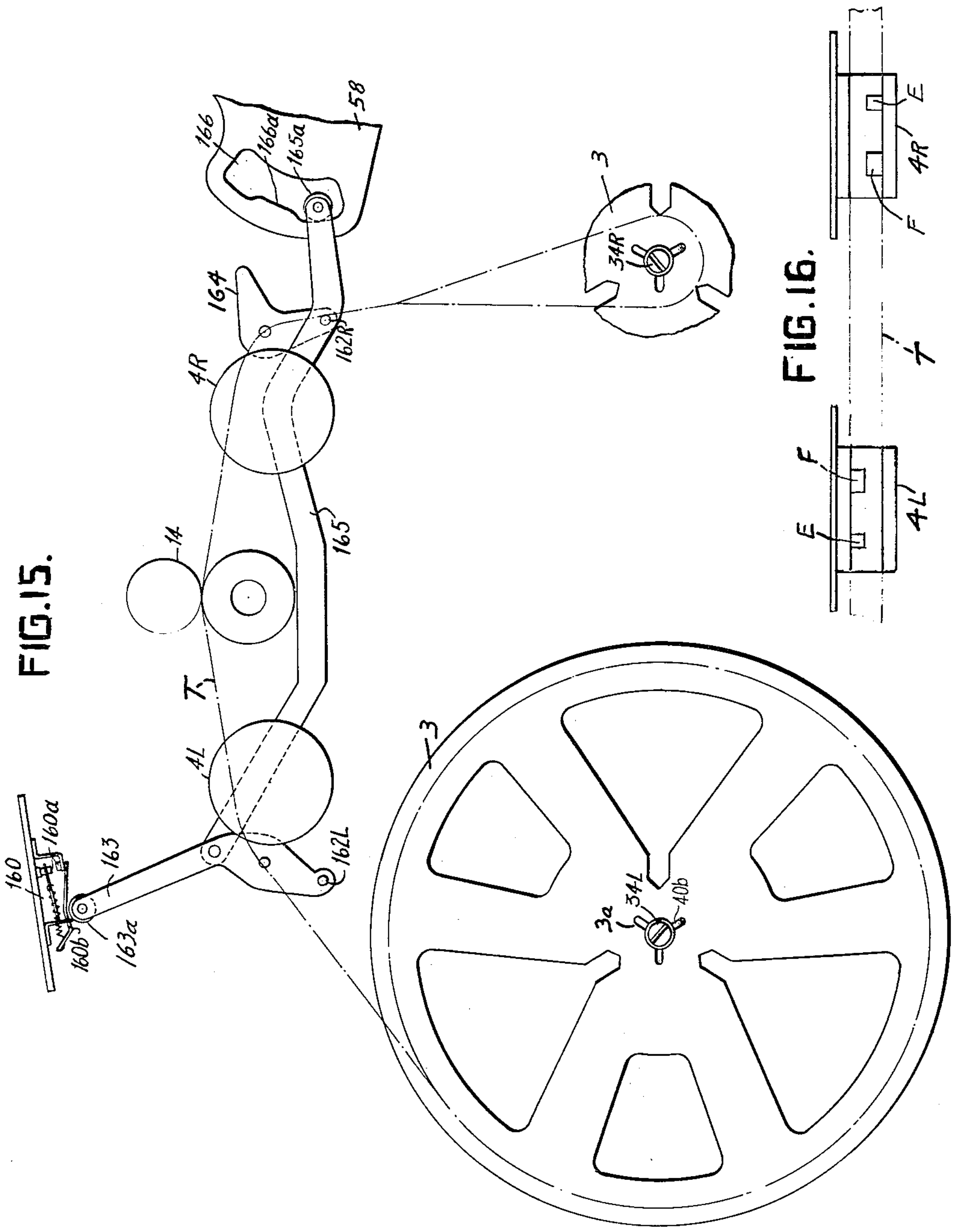
Figure 17:
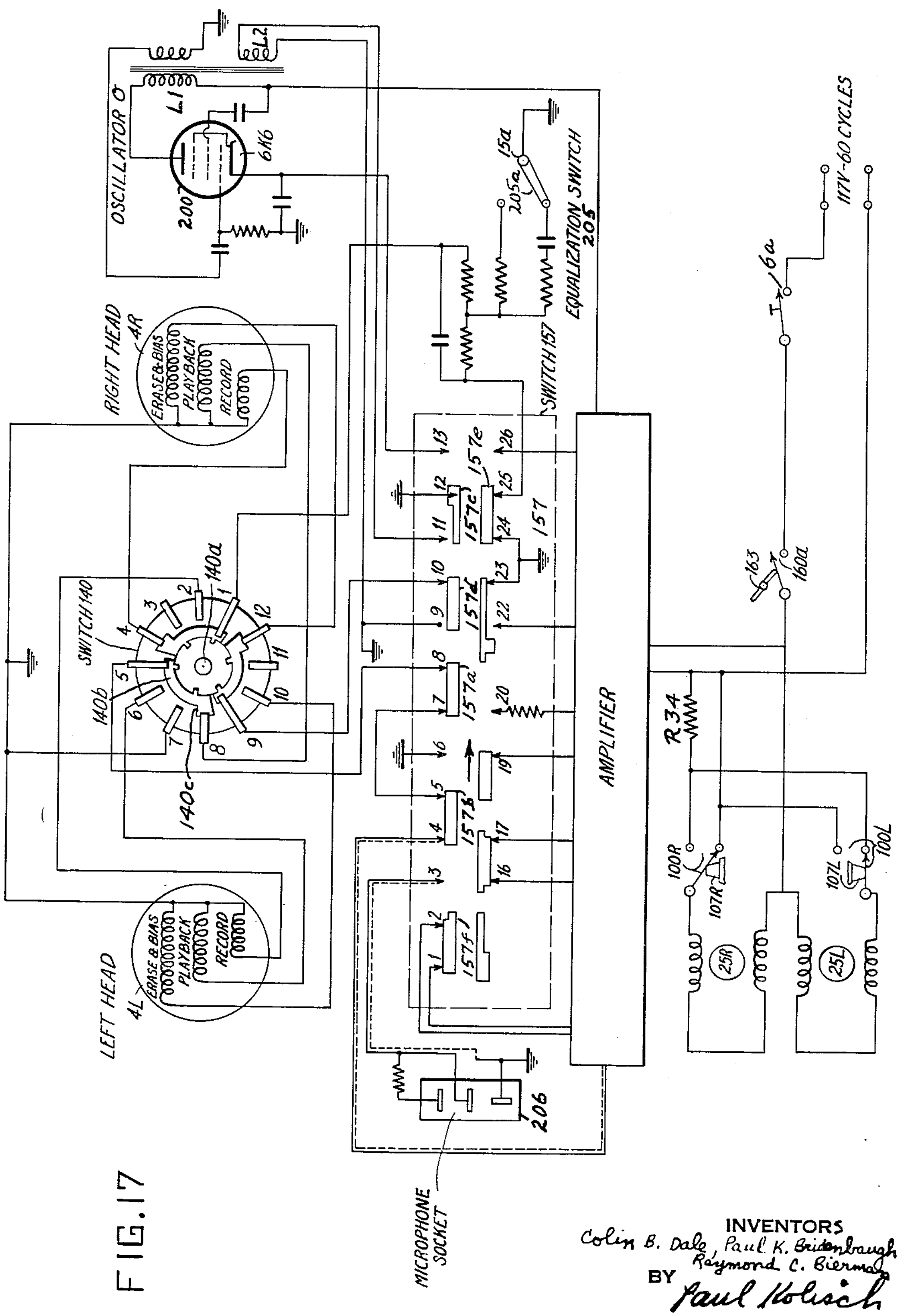

Fig. 4*a* is a detailed, fragmentary view of lever means associated with the pressure roller which coacts with a feed roller to feed the tape;

Fig. 5 is a plan view of certain parts shown in Figs. 2 to 4 and shows these parts in position to cause rewind of the tape onto the right hand reel;

Fig. 5*a* is an enlarged view of a switch means shown in Figs. 2 to 5;

Fig. 5*b* is a front view of this switch means;

Fig. 5*c* depicts a vertical cross section of the capstan assembly;

Fig. 6 is a view taken substantially along line 6—6 of Fig. 1, the feed control knob being removed;

Fig. 7 shows parts of Fig. 6 in a different position, and includes the feed control knob;

Fig. 8 is a view taken along line 8—8 of Fig. 2;

Fig. 9 shows certain parts of Fig. 8 in a different position;

Fig. 10 is a section through the end of a change-speed yoke and associated parts;

Fig. 11 is a section through the left hand reeling means for the tape;

Fig. 12 is a bottom view of a record or playback control switch and operating parts therefor;

Fig. 13 is a detail, rear view of operating linkage for the pressure roller and pressure pads;

Fig. 14 is an enlarged detailed end view of a pair of pressure pad levers;

Fig. 14*a* is a view looking down on a pair of the pressure pad levers, showing only portions of these levers;

Fig. 15 is a plan view of linkage and a switch operated by the tape when it reaches its end on a reel;

Fig. 16 is a diagrammatic view showing the edge elevation of the magnetic heads; and Fig. 17 diagrammatically shows the circuit of the recorder.

The recorder has duplicate left and right hand parts relating to left and right directions of tape travel. Such duplicate parts will be given a common reference number and differentiated by letters L and R.

Referring to Fig. 1, a main cover 1 is above most of the inside parts. Auxiliary dished covers 2 and **2*a* are above the level of cover 1 and are separated to form a passage for the tape T running from one reel 3 to the other. The covers 2 and 2*a* are above what may be called a head bridge assembly which includes magnetic transducing means, i. e. the magnetic heads 4L and 4R (see Figs. 2 to 4 and 16). In the lower left corner of the cover 1 is the knob 5 of an output selector switch. In the lower right corner is the knob 6 of a volume control and on-off switch. Knob 6 is encircled by the knob 7 of a tone control. At the upper left corner, the cover 1 exposes a tuning eye tube 8 which may be of type 6E5. A feed controller knob 9** is located at the upper right corner and encircles a push button R which is a control for conditioning the machine for recording operation.

The tape T comes off one reel, say the left hand one, over a channeled guide member 12L (see Fig. 4) across magnetic head 4L, between a feed couple comprising a feed roller 13 and rubber pressure roller 14, then across the head 4R, over a channeled guide member 12R, and to the other reel.

The slotted top of a tape speed selector 15 is exposed through cover 1 (Fig. 1). A coil or suitable tool may be applied to the slot in selector 15 to turn it from the position shown to a position 180 degrees away. In shown position, the selector 15 provides for a speed of 7½ inches a second for the tape; in the alternate position, it provides for a tape speed of 3¾ inches a second. Numerical scale 16L and R on cover 1 measure the length of the tape wound on each reel 3 in terms of minutes of tape travel at each speed. The reels are of transparent material through which the scales may be seen.

A box housing of which a portion 17 appears in Fig. 6 is provided for the recorder. Also seen in this figure is a portion of a base chassis 18 for mounting the speaker, tubes, and other elements of the electronic circuit. Side brackets 19, of which a portion of the right hand one is shown in Fig. 6, support a main frame plate 20. This frame plate is supported at the rear by an attached U-shaped rest 21. A sub-frame 22, constituting the head bridge assembly frame, is mounted on posts 23 on frame 20 (see, for instance, Fig. 2). The main cover 1 is attached to posts **23*a*, the auxiliary cover 2 to posts 24 on subframe 22, and the auxiliary cover 2*a* to the threaded tops of the guide members 12L** and R.

The two motors 25L and R (see Fig. 5) are mounted in the manner shown for 25L in Fig. 8, to the bottom of frame 20. The upper portions of the motor shafts 26L and R (see Figs. 2 to 4) are drive elements in the tape feed trains when a tape speed of 3¾ inches a second is selected. Collars 27L and R on the motor shafts are twice the shaft diameter and are the drive elements in the tape feed trains when tape speed of 7½ inches a second is desired. Collars 27L and R also serve as reel drive elements.

The tape feed trains include rubber-tired idlers 28L and R, which are moved by means described later, alternatively into engagement between drive elements on the motor shafts and a capstan wheel 30 (also see Fig. 5c) which is concentric to feed roller 13 and fixed to a flange of the hub 31 of the feed roller. The hub 31 is journaled on a rod 32 bolted to frame 20. Feed roller 13, wheel 30, and hub 31 constitute a capstan which in coaction with pressure roller 14 (Figs. 2 to 4) feeds the tape across the magnetic heads 4L and 4R. Motors 25L and R rotate at equal speed in clockwise and counterclockwise directions, respectively. With idler 28L in operative position, it transmits the clockwise rotation of motor 25L to the capstan to feed the tape to the right. When idler 28R is operative, it transmits the counterclockwise rotation of motor 25R to the capstan to feed the tape to the left. The capstan will thus be driven in either direction at constant speed to coact with pressure roller for advancing the tape at a uniform rate across the magnetic heads. Further, the smooth periphery of feed roller 13 serves in conjunction with pressure roller 14 to iron out drive ripples in the tape to insure smooth, even travel of the tape.

Upright reel spindles 34L and R (Figs. 2 to 5, and 11) are fixed at their lower ends to arms 35L and R of angular levers 36L and R which are rockable on fixed pivots 37L and R. Rotatably disposed on the reel spindle 34L and suitably held against axial displacement on the spindle is a rigid assembly of a rubber-tired wheel 38L and a brake drum 39L, the drum being above the wheel. A similar assembly of a wheel 38R and a brake drum 39R is rotatably mounted on reel spindle 34R. Resting on the brake drums are reel cups 40L and R which are notched at the bottom to receive lugs 39*a* bent up from the brake drums. The reel cups have sleeves 40*a* fitting over the upper portions of the reel spindles, each sleeve being provided with a key 40*b* (Figs. 1 and 8) to engage in one of the notches 3*a* in the hub of a reel 3 (see Fig. 15). The reels are thus keyed to the reel cups which are in turn interlocked with lugs 39*a*, so that the reels and reel cups will rotate with the brake drums 39 and the connected wheels 38.

When tape feed to the right is selected, lever 36R (see Fig. 3) is rocked to engage wheel 38R with collar 27R on motor shaft 26R. Since 26R rotates counterclockwise, the right hand reel will be rotated clockwise to take up the tape. If tape feed to left is selected (see Fig. 4), it is lever 36L which is rocked to engage wheel 38L with collar 27L which will drive the left hand reel counterclockwise to take up the tape.

Brake levers 42L and R are carried by the angular levers 36L and R are pivoted to the angular levers by pins 43L and R fixed to the angular levers. The brake levers may move bodily with the levers 36L and R and may also rock relatively thereto to engage brake shoes 44L and R alternatively with brake drums 39L and R.

The means for selecting the directions of tape travel and controlling operations of the idlers 28L and R, reel spindle carrying levers 36L and R, and brake levers 43L and R, include the previously mentioned knob 9 (see Figs. 1 and 7). Knob 9 is attached to a hollow shaft 45 (Figs. 2 to 5, 6 and 7) which is journaled in a bearing sleeve 46 secured to frame 20. Fixed to shaft 45 is a disk 47 with three notches 47*a* (Figs. 2 to 5). A detent lever 48, pivoted on frame pin 49, is urged clockwise by a spring 50 so as to engage a roller 51 in one of the notches for retaining the shaft 45 impositively in one of three rotative positions of the shaft. In Fig. 2, shaft 45 is in neutral, tape stopping position; in Fig. 3, the shaft has been turned clockwise into position for selecting tape travel to right; and in Fig. 4, the shaft has been turned counterclockwise into position for selecting tape travel to the left. The shaft 45 also is vertically adjustable, against the resistance of a spring 53 (Figs. 6 and 7) from a normal upper position to a depressed position. In Figs. 2 to 4, the shaft is in upper position and it will be noted that a lobe 47*b* of disk 47 is in registration with the concavely shaped free edge of the horizontal leg 54*a* of an angle bracket 54 on frame 20 only when the shaft is in neutral position (Fig. 2). In either turned position (Figs. 3 and 4), the lobe 47*b* overlies a wing of the leg 54*a* which blocks depression of the shaft. If turned to neutral position, the shaft may be depressed (Fig. 7 shows the extreme depressed position) and then adjusted clockwise or counterclockwise until one of the end notches 47*a* is engaged by the detent roller 51. When thus adjusted in its down position, the lobe 47*b* underlies a wing of the leg 54*a* (see Fig. 5) which blocks restoration of the shaft by spring 53. When the shaft is returned to neutral position, the spring 53 restores the shaft to normal upper position.

The clockwise and counterclockwise positions of the shaft 45 are the same whether the shaft be in upper or lower position. However, in the upper position of the shaft, it controls travel of the tape for recording or reproducing runs, while in the lower position it controls rewind travel of the tape at increased speed, in a manner which will be made clear later.

The control of tape travel by the shaft 45 is effected through a cam plate 55. The cam plate rests on a pair of shelves 20*a* integrally bent up from frame 20 to lie above the plane of the frame (see Figs. 2 and 6). Guide studs 56L and R secured to shelves 20*a* pass through straight horizontal end portions of symmetrical left and right hand slots 57L and R in the cam plate and guide the cam plate for horizontal movement. The connection between the controller shaft 45 and the cam plate 55 includes a lever 58 which is pivoted on a pin 59 carried by frame 20. The lever 58 is substantially U-shaped, with the lower leg extended to provide opposite arms 58*a* and *b*, and the upper leg extended to provide an arm 58*c* parallel to arm 58*b*. A pin 60 on cam plate 55 is engaged in the slotted end of arm 58*a* and rocking of the lever 58 will thereby adjust the cam plate. The slot in the upper arm 58*c* receives a pin 47*c*, rising from disk 47, when the shaft 45 is in its upper position (see particularly Fig. 6). When the shaft is depressed to lower position (see Figs. 5 and 7), the pin 47*c* leaves the arm 58*c* and a pin 47*d*, depending from disk 47, enters the slot in the free end of arm 58*b*. It is to be noted that the pins 47*c* and *d* are at different radial distance from the axis or shaft 45 and are both aligned with their receiving slots in arms 58*c* and *b*, respectively, only when the shaft is in neutral rotative position (Fig. 2), which is also the only position in which the shaft may be depressed or restored, as previously explained. With shaft 45 in upper position, the pin 47*c* is effective to rock the lever 58 upon turning of the shaft. In the depressed position of the shaft, the pin 47*d* is effective to rock the lever. Since pin 47*d* has a greater moment arm than pin 47*c*, the lever 58 will be rocked through a greater angle and the cam plate 55 moved further when the shaft is turned while in depressed position than while in raised position (compare Figs. 3 and 5). In this way, the same clockwise or counterclockwise position of shaft 45 produces distinctively different adjustments of the cam plate, depending on whether the control shaft 45 is in raised or lowered position, for a purpose which will be made clear.

Cam plate 55 has symmetrical left and right hand cam edges for controlling positions of the idlers 28L and R, the reel spindle carrying levers 36L and R, and the brake levers 43L and R. The brake levers are under further control of a pair of slides 61L and R which are slidably guided by headed studs 62L and R on cam plate 55 for movement along the cam plate. Springs 63L and R connected between the cam plate and slides 61L and R urge the respective slides towards the left and the right ends of the cam plate. The slides 61L and R are elements of "remembering" means for selectively operating the brake levers 43L and R upon return of the cam plate to its neutral position when the feed control shaft is returned to the neutral, feed stop position (Fig. 2). The operation of the "remembering" means will be described later on.

The means relating to the idlers 28L and R will now be fully described. It has been explained that idlers 28L and R will be operative alternatively, according to the desired direction of tape feed, to transmit drive of the motors 25L and R to the common capstan wheel 30. It has also been explained that when tape speed at 3¾ inches a second is desired, the idlers will be driven by the adjacent motor shafts, but that when tape speed at 7½ inches a second is desired then the idlers will be driven by the collars 27 on the motor shaft. To engage either the motor shafts or the collars 27 thereon, means are provided to shift the idlers vertically. The shifting means will be operated under control of the speed selector 15 (see Fig. 1). The idlers are supported by links 65L and R (Figs. 2, 3, 4, 8, 9 and 10) and rotatable on axle pins 66L and R fixed to the free ends of the links. Conventional spring clips 66*a* (Fig. 8) slipped into engagement with grooves in the upper ends of the pins 66L and R retain the idlers on the links. The links 65L and R are supported by rocker arms 67L and R which are provided at their free ends with pins 68L and R passing through the U-shaped rear ends of the links to hinge the links to the rocker arms. Rocker arms 67L and R are U-shaped at the rear and freely mounted on pins 70L and R rising from frame 20. A yoke 71 is formed with a U-shaped central portion through which a vertical post 72, fixed on frame 20, freely passes to guide the yoke for vertical adjustment. The opposite arms of the yoke extend between the legs of the U-shaped rear ends of rocker arms 67L and R and force the rocker arms to move vertically along with the yoke.

A coil spring 73, around post 72, is confined between the bottom of the U-shaped central portion of yoke 71 and a washer 74 fixed to the post. The spring urges the yoke downwardly to keep a follower pin 71*a*, extending rearwardly from the yoke, seated on a cam 75. Cam 75 is integral with the previously mentioned speed selector 15 (also see Fig. 1) which is fixed to a shaft 15*a* journaled in a sleeve 76 rising from frame 20. The cam 75 has a spiral rise through a span just short of 180 degrees, the lower end of the spiral being flanked by a wall 75*a* and the upper end by a depression 75*b* and a wall 75*c*. In Fig. 9, the pin 71a is on the lower end of the spiral of the cam and against the wall 75*a*. The cam may be turned 180 degrees to the position in Fig. 8 before the pin 71*a* abuts the wall 75*c*. As the cam is turned to the latter position, the pin 71*a* is raised by the cam until it snaps into the depression 75*b* and abuts the wall 75*c*. The seating of the pin 71*a* in depression 75*b* impositively retains the pin in its upper position.

In the lower position of the pin 71*a* (Fig. 9) the yoke 71, rocker arms 67L and R, links 65L and R supported by the rocker arms, and idlers 28L and R carried by the links, are all in their lower positions. In the lower position of the idlers they are opposite collars 27L and R and movement of an idler into operative position will engage it between the adjacent collar and the capstan wheel 30 to cause rotation of the capstan at a speed such as to feed the tape at a rate of 7½ inches a second. When the cam 75 is turned to the position shown in Fig. 8, it causes the yoke 71, arms 67L and R, links 65L and R, and idlers 28L and R to rise to their upper positions. In the upper position of the idlers, they are opposite the upper, drive portions of the motor shafts 26L and R. Movement of an idler into operative position will then engage it between the adjacent shaft 26L or R and the capstan wheel, and the capstan will be rotated at a speed for feeding the tape at a rate of 3¾ inches a second.

It is to be noted that the idlers 28L and R are free to move down to lower position only while the idlers are in disengaged positions with respect to the motor shafts 26L and R. Both idlers are in the disengaged positions only when the cam plate 55 and its control shaft 45 are in neutral position (see Fig. 2). In the clockwise position of shaft 45 (Fig. 3), the idler 28L, while in upper position, is engaged with the upper, drive portion of shaft 26L and overlaps the upper side of the collar 27L. Attempted lowering of the idlers will then be blocked by the idler 28L abutting the upper side of collar 27L. Similarly, when idler 28R is in upper position and engaged with the upper, drive portion of shaft 26R (Fig. 4), shifting of the idlers to lower position will be blocked by the idler 28R abutting the top side of the collar 27R. It is necessary, therefore, to return the control shaft 45 to neutral position before tape speed can be changed from 3¾ inches a second to 7½ inches a second.

The movements of the idlers to and from engaged positions between the drive elements on the motor shafts 26L and R and the capstan wheel 30 are under control of bell crank levers 80L and R. These levers pass under the cam plate 55 and are pivoted on frame studs 81L and R. The free ends of the horizontal arms of the levers (as viewed in Figs. 2 to 5) are provided with pins 80*a* for following the upper edge of the cam plate 55. The vertical arms of the levers 80 have upwardly bent free ends 80*b* which are connected by a spring 82. Spring 82 urges the levers 80 in directions to maintain their respective pins 80*a* firmly engaged with the upper edge of the cam plate 55. The upwardly bent ends 80*b* of levers 80L and R abut the rocker arms 67L and R to control their movements under the influence of a spring 83 between the links 65L and R.

In neutral position of feed controller knob 9 and its shaft 45 (Fig. 2), cam plate 55 is in central position with the upper edge under both pins 80*a* of levers 80L and R. Both levers are then held in positions for keeping the rocker arms 67L and R and links 65L and R in their outer positions in which the idlers 28L and R are both disengaged from the drive elements and the capstan wheel 30. When shaft 45 is turned to its clockwise position (Fig. 3), cam plate 55 is shifted to the right to bring a cam depression 85L under the pin 80*a* of lever 80L. Lever 80L is thereupon rocked counterclockwise by spring 82 and the bent end 80*b* of this lever retreats, allowing spring 83 to move the arm 67L clockwise. As arm 67L moves clockwise, it carries link 65L to the right to bring the idler 28L into engagement between a drive element of motor shaft 26L and the capstan wheel 30.

When cam plate 55 is shifted to right (Fig. 3) its high level, upper edge rides under the pin 80*a* of lever 80R which stays in the same position as in Fig. 2. Accordingly, the idler 28R will remain in disengaged position. In the foregoing manner, the turning of shaft 45 to its clockwise position adjusts cam plate 55 to a position for causing only the idler 28L to become operative, while the idler 28R remains ineffective. The capstan will be driven clockwise and cause tape feed to the right. When shaft 45 is returned to neutral position (Fig. 2), the cam plate 55 shifts back to the left and the inclined side of cam depression 85L cams the lever 80L clockwise. Lever 80L thereupon restores the rocker arm 67L, link 65L, and idler 28L to their former positions in which idler 28L retreats from the capstan wheel and the drive element on motor shaft 26L.

When tape feed to left is desired, shaft 45 is turned counterclockwise to shift cam plate 55 to its left (see Fig. 4). This brings cam depression 85R under pin 80*a* of lever 80R; the lever rocks clockwise, allowing rocker arm 67R to move counterclockwise, whereupon link 65R moves inwardly and idler 28R engages a drive element on shaft 26R and the capstan wheel 30.

It is desired to have wear on the idlers 28 reduced to a minimum because their rubber rims are perishable. Wear on the idlers will be reduced to a minimum by settling the selected idler in rotation before it meets the capstan wheel. For this purpose, the spring 83 is connected to links 65 to exert its pull along a line below their pivots 68. The spring will thereby urge the links downwardly against fixed pins 86L and R. When a link 65 is moved inwardly, it moves along a pin 86 in a path for causing the idler 28 on the link to meet the drive element on the adjacent motor shaft before the idler meets the capstan wheel 30. The idler will therefore be in rotation by the time it contacts the capstan wheel.

Concurrently with selective operation of the idlers 28L and R, the reel spindle carrying levers 36L and R will be selectively operated. The arms 35L and R reach at their free ends under the cam plate 55 and are provided with pins 35*a* which engage with the lower edge of the cam plate. The lower edge of the cam plate is recessed between inclined cam edges 89L and R. In the neutral position of shaft 45 and the cam plate 55 (Fig. 2), the pins 35*a* are both outside the recessed portion and the levers 36L and R are held in positions in which the wheels 38L and R are out of engagement with collars 27L and R. Springs 90L and R are connected between pins 86L and R and the brake members 42L and R. The brake members, as previously mentioned, are pivotally carried by levers 36L and R on pivot pins 43L and R. Arms 42*a* of the brake levers are bent down at their free ends into slots 91*a* of bell crank levers 91L and R. These levers are elements of the brake control means and their operation will be described fully later on. For the present, it is sufficient to note that lever 91R will be stationary when the parts are adjusted from the position shown in Fig. 2 to the position in Fig. 3. As shaft 45 is turned to the latter position, it shifts cam plate 55 to the right and cam edge 89R rides past the pin 35*a* on arm 35R of lever 36R. The pin 35*a* now is at the recessed portion of the lower edge of the cam plate and lever 36R is free to rock counterclockwise. The force for rocking the lever 36R is provided by spring 90R pulling on the brake lever 42R. The pull of spring 90R will move the brake lever 42R bodily upward, without any appreciable angular movement, with the bent end of its arm 42*a* sliding along the slot 91*a* in lever 91R. Lever 42R thus acts under the stated condition in the manner of a link connecting the spring 90R to the pin 43R of the lever 36R. When the lever 36R moves to its counterclockwise position shown in Fig. 3, it brings the wheel 38R into contact with the drive collar 27R. The right hand reel 3 (Fig. 1) will now be driven clockwise by motor 25R. Since idler 28L is also now engaged between a drive element on the shaft 26L or motor 25L and the capstan, as previously explained, the tape will be fed to the right by the capstan and the right hand reel will be rotated clockwise by motor 25R to take up the tape after being operated on.

Similarly, when shaft 45 is turned to its counterclockwise position (Fig. 4), the cam edge 89L will ride to the left past the pin 35*a* on arm 35 of lever 36L. Lever 36L will then be rocked clockwise about its pivot 37L by spring 90L pulling on the lever 42L carried by lever 36L. Clockwise movement of lever 36L engages wheel 38L with collar 27L on the shaft of motor 25L. The left hand reel 3 (Fig. 1) will now be driven counterclockwise to take up the tape which is being fed to the left, since the idler 28R has also been moved into operative position, in the manner explained before.

When feed of the tape is to be stopped, the control shaft 45 is returned to its neutral position by means of the uni-control knob 9 (Fig. 2). Stopping of the tape feed to right requires that the left hand reel 3 must be braked. Stopping of feed to the left requires the braking of the right hand reel. Since the neutral position of the shaft 45 is the same in either case, means must be provided to "remember" the direction in which the tape has been feeding and cause the proper one of the brakes to be applied. The "remembering" means includes the slides 61L and R, previously mentioned, which are carried by the cam plate 55. The forward ends of the slides are urged by the springs 63L and R into overlapping positions with respect to the slots 57L and R in the cam plate and supplement these slots in controlling the operations of levers 91L and R. These levers are pivoted on frame studs 92L and R and their upper arms (as viewed in Figs. 2 to 5) are provided at the free ends with pins 91*b* intruding into slots 57L and R of the cam plate. Springs 93L and R urge the levers 91L and R clockwise and counterclockwise, respectively.

When the parts are in Fig. 3 position for controlling tape feed to the right, the pin 91*b* of lever 91L is sitting on the level 94L of the bottom edge of slot 57L and the left end of slide 61L has moved to the right away from this pin 91*b*. The other lever 91R has its pin 91*b* sitting on top of slide 61R. Both slides are being held by their springs 63L and R in their rear positions in which the guide pins 62L and R abut the rear ends of the guide slots in the slides. Both brake levers 42L and R are also in ineffective position.

To stop the tape feed to the right, the shaft 45 is returned to its neutral position (Fig. 2), shifting cam plate 55 to the left back to its central position. Upon this movement of the cam plate, it brings a low level 95L of the bottom edge of slot 57L under pin 91*b* of the lever 91L. The pin drops down from the higher level 94L to the lower level 95L under the influence of spring 93L which rocks the lever 91L clockwise. Clockwise movement of lever 91L rocks the brake lever 42L counterclockwise to apply the brake shoe 44L to the drum 39L. The left reel is thus braked to a stop when tape feed to the right is stopped. When the cam plate 55 moves to the left from its Fig. 3 position to its Fig. 2 position, slide 61L moves, under the influence of spring 63L, along with the cam plate until stopped by engagement of its left end with pin 91*b* of lever 91L. The slide 61R also is moved to the left by the positive engagement between the guide pins 62R and the rear ends of the guide slots in the slide, so that there is no change in relative position of the slide 61R on the cam plate when the cam plate is shifted back from Fig. 3 position to Fig. 2 position. Upon the completion of this movement of the cam plate 55 and the slide 61R, the upper edge of this slide is still under pin 91*b* of lever 91R. Lever 91R therefore remains in normal position, in which it allows brake lever 42R to remain disengaged from brake drum 39R. The right hand reel will thus coast to a stop to take up slack tape.

When the shaft 45 is turned from its neutral position (Fig. 2) to the counterclockwise position (Fig. 4) to select tape feed to the left, the cam plate 55 is shifted to the left. As the cam plate moves in this direction, the pin 91*b* of lever 91R drops off the slide 61R and onto the level 94R. At the same time, the inclined edge 96L at the right of low level 95L cams pin 91*b* of lever 91L up, over the inclined upper left corner of slide 61L and onto the top of this slide. As soon as the pin 91*b* of lever 91L rides up to the top of slide 61L, it no longer prevents the spring 63L from moving the slide to its extreme leftward position on the cam plate 55. The guide pins 62R, by engagement with the rear ends of the guide slots in slide 61R, have moved the latter slide along with the cam plate to the left. The positions of the levers 91L and R in Fig. 4 with respect to the cam plate 55 and the slides 61L and R are now reversed from their positions in Fig. 3.

Upon return of shaft 45 from its Fig. 4 position to its Fig. 2 position, the cam plate 55 will move to the right back to its central position. The slide 61L will move back to the right along with the cam plate to a position in which its upper edge will still be under the pin 91b of lever 91L. At the same time, the slide 61R will be moved to the right by spring 63R, until its right end abuts the pin 91b of lever 91R. The latter pin will drop to the low level edge 95R and spring 93R will rock lever 91R counterclockwise. This will effect clockwise movement of the brake lever 42R to engage its brake shoe 44R with drum 39R. The right hand reel will thus be braked to a stop, while the left reel will coast to a stop.

In the above manner, slides 61L and R supplement the cam slots in the cam plate 55 to cause the brakes to be selectively applied to the reels upon the return of shaft 45 from a feed control position to the single neutral position. If the tape has been feeding to the right, the return of the shaft to neutral position will cause the left reel to be braked, but if the tape has been feeding to the left, the return of the shaft to neutral position will cause the right hand reel to be braked.

Two transfer switches 100L and R (Figs. 2 to 5, 5*a* and 5*b*) are mounted on an insulating piece 101 which is secured to frame plate 20. Switches 100L and R are provided with central blades spring-connected to fulcrumed operating members 105L and R. In the normal position of a switch, its central blade is against a rear contact stud. Pressure against the bowed arm of the switch operating member 105 results in the central blade transferring to the front contact stud. For controlling the switches, the cam plate 55 carries at its left end a molded piece 106 formed with two cam projections 107L and R spaced apart horizontally and in planes opposite the switches 100L and R, respectively.

With cam plate 55 in neutral position (Fig. 2) the bowed arms of members 105L and R are free between the projections 107L and R. Shift of the cam plate to the right to Fig. 3 position causes the bowed arm of member 105R to ride up on the right inclined edge of the projection 107R and onto the top of this projection. Member 105R is thereby operated to transfer the contact blade of switch 100R. The purpose of this, as will be brought out more fully in the circuit description, is to insert resistance in the motor 25R. This is the motor which will act, in the Fig. 3 position of the cam plate 55, to drive the right hand reel for take up of the tape. The insertion of resistance in the motor circuit will reduce the motor torque so that it will act as a stall torque drive for the tape take-up. If the cam plate is moved to the opposite position shown in Fig. 4, the bowed arm of member 105L will ride up onto the top of projection 107L and switch 100L will transfer its contacts. Resistance will thereby be inserted in the circuit of motor 25L which will be acting as the take-up motor when the cam plate is in Fig. 4 position.

When the tape is being rewound on a reel, the take-up motor driving this reel is required to operate at full power so as to effect fast transport of the tape. As described before, to set the machine for rewind operation, the shaft 45 is depressed before turning (see Fig. 7), and thereby produces a greater movement of the cam plate than when the shaft is operated in its raised position. Fig. 5 shows the position of the cam plate to which it is moved when the shaft is depressed and turned to its clockwise position. Fig. 3 shows the position of the cam plate to which it is moved when the shaft is turned to its clockwise position while in normal raised position. It is to be noted that there is no difference in the positions of the follower levers 36L and R, 80L and R, and 91L and R between Figs. 3 and 5. On its way to Fig. 5 position, the cam plate traverses its Fig. 3 position whereupon the follower levers take the positions for tape feed to the right and for tape take-up under the power of motor 25R. The further advance of the cam plate from its Fig. 3 to its Fig. 5 position has no effect on the follower levers because of the dwell of the several cam edges. The only difference between the control affected by the cam plate in its Fig. 5 position with respect to the control by the cam plate in its Fig. 3 position is in the operation of the switch 100R. In the Fig. 3 position, the cam projection 107R is engaging the operating member 105R of switch 100R, causing transfer of its contacts for inserting resistance in the motor 25R. In the Fig. 5 position, the projections 107L and R have both moved clear to the right of the switch members 105L and R and neither switch 100L nor 100R is transferred. Resistance will not be inserted, therefore, in the motor 25R which will then operate at full power to drive the right hand reel for rewinding the tape.

When rewind on the left reel is required, the shaft 45 is depressed and turned to its counterclockwise position. This will shift cam plate 55 to its extreme left position. The follower levers will be operated by the cam plate to the same positions as in Fig. 4, but the projections 107L and R will be clear to the left of members 105L and R. Switches 100L and R will, therefore, remain normal and motor 25L will operate at full power to drive the left reel for rewinding the tape.

The feed controller shaft 45 not only controls the cam plate 55 for the purposes described, but also controls the positions of pressure roller 14 with respect to feed roller 13 and of levers 108L and R and 109L and R which carry felt pads for pressing the tape into intimate contact with the magnetic heads 4L and R.

The pressure roller 14 is rotatable on a pin 14a fixed to an arm 110 which is rockable on a pivot 111 carried by sub-frame 22 (see Fig. 2). Also mounted on the same pivot 111 is a rocker arm 112 which has a hole 112a (see also Fig. 4*a*) through which the shank of a pin 110a on lever 110 loosely passes. The rocker arms 110 and 112 are thus capable of relative movement about pivot 111, within the limits of the play of pin 110a in hole 112a. A spring 113 connects the arms 110 and 112 and normally maintains the arm 112 at its upper limit with respect to the arm 110. At the free end of the arm 112 it is provided with a follower pin 112b in engagement with a cam 114 fast on a shaft 115 suitably journaled on frame 22. The cam is formed with a central V depression flanked by symmetrical arcuate edges. A spring 116 between frame 22 and lever arm 110 holds the follower pin 112a engaged with the cam. Behind frame 22 a bell crank lever 117 is fast to shaft 115 (also see Fig. 13). The lower arm of this lever is pivotally secured to one end of a link 118. At its other end, the link 118 (see Figs. 2 and 5) has a hole 118a which receives a pin 119 on disk 47 when shaft 45, to which disk 47 is secured, is in its normal raised position. The link 118 is restricted to moving within its own plane and against vertical displacement by reason of the link passing through a slot 120 (see Figs. 6 and 7) formed in the vertical leg 54b of the bracket 54. The slot is open at the left (as viewed in Figs. 6 and 7) so as not to interfere with the angular movement of the link which occurs when disc 47 is turned to clockwise or counterclockwise position. A spring 121 connects the right end of link 118 to bracket 54 and urges the link against the closed end of slot 120.

When shaft 45 is in neutral position (Fig. 2) the pin 119 is centrally positioned between its clockwise and counterclockwise positions (Figs. 3 and 4) and the link 118, bell crank lever 117, shaft 115, and cam 114 are all in their neutral positions. The follower pin 112b is then at the bottom of the V depression in the cam and assisting in maintaining the cam in its neutral position. With the follower pin 112b at the bottom of the V depression, the rocker arm 110 is in upper, counterclockwise position in which it holds the pressure roller 14 clear above the feed roller 13. Since the neutral position of the shaft 45 is its tape feed stop position, the pressure roller 14 is not required to engage the feed roller 13 at this time and its separation from the feed roller enables the tape to be freely threaded in its course through the operating station between the reels.

When feed of the tape for a recording or reproducing run is desired, the shaft 45 is turned, while in normally raised position, to its clockwise or counterclockwise position depending on which direction the tape is to be fed, as previously described. Turning of the shaft to its clockwise position is effective through pin 119 to move link 118 to the right. The link rocks the bell crank lever 117 counterclockwise (Fig. 3) to turn shaft 115 and cam 114 in the same direction. As the cam turns counterclockwise, it cams the follower pin **112*b* out of the central V depression and onto an arcuate edge. Encounter of the pressure roller with the feed roller stops further downward movement of the arm 110. Lever 112, however, continues to be depressed by the cam until the pin 112*b* is on top of the arcuate edge. Spring 113 stretches during the final movement of arm 112 relative to arm 110 and thus serves to urge arm 110 downwardly into its normal relation to arm 112. In this way, the ultimate force holding the pressure roller down is the yieldable force of spring 113**, enabling the pressure roller to yield to accidental obstructions in the feed path.

When tape feed to the left is desired, shaft 45 is turned to its Fig. 4 position. Pin 119 moves link 118 to the left, rocking the bell crank lever 117, shaft 115, and cam 114 clockwise. The action of the cam on the arms 110 and 112 and pressure roller 14 is the same as in the preceding case except that the follower pin **112*b*** is cammed onto the arcuate edge to the right of the V depression instead of being cammed onto the arcuate edge to the left.

When tape feed to the right is required for a reproducing or recording run, the magnetic head 4L is to be effective and levers 108L and 109 will be rocked into positions in which the felt pads carried thereby will press the tape into intimate contact with the head 4L. If tape feed to the left is selected, head 4R will be placed in circuit and levers 108R and 109R will be moved down to press the tape against this head. Each pair of levers 108 and 109 is on a common pivot 125 (also see Figs. 14 and 14*a*) secured to sub-frame plate 22. A spring 126 connects the vertical arms of levers 108L and R, normally keeping their horizontal arms, which are of spring metal, against posts 24 (see particularly Fig. 2). A coil spring 127 extends between each lever 108 and the companion lever 109 and normally keeps lever 109 against a lug **108*a* of lever 108. In the neutral position of the parts (Fig. 2) levers 108L and R are engaged by the forwardly bent opposite ends of a lever 130. Lever 130 is behind the frame plate 22 (see Fig. 13) and rockable on a pivot 131 extending rearwardly from the frame plate. The forwardly bent ends of lever 130 extend through arcuate openings 132 in the frame plate into engagement with the levers 108L and R at the front side of the frame plate. One of the arms of lever 130 is pivotally connected by a link 133 to the bell crank lever 117. As previously described, lever 117 is fixed to shaft 115 of cam 114 and is operated through link 118 and pin 119 by shaft 45**.

When shaft 45 is turned to its clockwise position (Fig. 3), the lever 117 is rocked counterclockwise and through link 133 actuates the lever 130 in the same direction. Consequently the left end of the lever 130 moves down and forces the pressure pad lever 108L counterclockwise. The companion lever 109L follows under the influence of spring 127 and the felt pad at its free end reaches operative position before the pad on lever 108L is at its operative position. Lever 108L continues to move under the force of lever 130, spring 127 stretching meanwhile, until the pad at the free end of the springy horizontal arm of lever 108L is firmly pressing the tape against a part of the head 4L.

In the above manner, when shaft 45 is in raised position and turned to its clockwise position for causing tape feed to right, it operates means for moving the felt pad carrying levers 108L and 109L into coaction with the head 4L.

When shaft 45 is turned to its counterclockwise position (Fig. 4), it acts through link 118 to rock lever 117 clockwise. Through the connecting link 133, the lever 130 is rocked clockwise and its right end actuates the levers 108R and 109R in the same direction to bring the felt pads on these levers into pressure engagement with head 4R.

It may be noted that the pad on a lever 108 is arranged to press the tape against the core E (see Fig. 16) of the erase magnet in one of the heads 4L and 4R while the pad on the lever 109 is arranged to press the tape against the common core F of record playback, and bias coils which are shown in the circuit diagram (Fig. 17).

To permit the tape to travel freely at increased speed during rewind operation, the pressure roller 14 and the felt-padded pressure levers 108 and 109 are maintained in their inactive positions (Fig. 2) during such operation. As previously explained, to condition the machine for rewind operation, shaft 45 is depressed while in neutral position and then turned to its clockwise or counterclockwise position, depending on the desired direction of tape transport. Upon depression of shaft 45, the pin 119 on disk 47 moves down out of the hole **118*a* at the right end of the link 118 (see Figs. 5 and 6). When shaft 45 is then turned to its clockwise or counterclockwise position, it does not operate the link 118. The link and the connected parts, including bell crank lever 117, cam 114 and lever 130 rest in their neutral positions (Fig. 2), being retained therein by the follower pin 112*b* seated at the bottom of the V depression in cam segment 114. Pressure roller 14 does not bear on feed roller 13 and neither set of padded levers 108 and 109 bears on head 4L or 4R. The tape is thus free of pressure and friction on its surface and its fast transport is unhindered. Transport of the tape takes place by the reeling action of the reel which is rewinding the tape and is rotating under the full power of motor 25L** or R, as the case may be.

Shaft 45 in up position is turned to select the direction of tape travel and bring the pressure roller 14 into coaction with feed roller 13 and a set of levers 108L and 109L or 108R and 109R into coaction with the head 4L or 4R, as already explained. In addition, the shaft when up and turned operates switching means to switch the required head into the circuit. The switching means comprises a rotary switch 140 carried by a bracket 141 (see Fig. 6) dependently secured to frame 20. Shaft **140*a* of the switch is provided with a crank arm 142 slotted at its free end. When the shaft 45 is up, a pin 143 on a member 144 fixed to the shaft is in the notched end of the crank arm 142. In neutral position of shaft 45, the switch 140 is in off condition. When the shaft 45 is up and turned clockwise, pin 143 coacts with crank arm 142 to turn the switch shaft 140*a* to a position for switching the head 4L into circuit. Turning of the shaft 45 to counterclockwise position results in actuation of switch shaft 140*a* to a position for bringing the head 4R into circuit. Neither head is to function when tape rewind operation is desired. Tape rewind is selected by depressing and turning the shaft 45. Depression of the shaft 45 disconnects the pin 143 from crank arm 142, so that switch 140** will stay in off condition.

The recorder is normally conditioned for playback. To condition the machine for recording on the tape, the push button R (see Figs. 1 and 6) must be pushed down before knob 9 and its shaft 45 are turned while in up position. Push button R is on top of a shaft 145 which is inside hollow shaft 45 and reaches below it. Near its lower end, shaft 145 freely passes through the horizontal flange **146*a* of an angle bracket 146 fixed to the bottom of the U-shaped bracket 141. Below the flange 146*a*, the shaft 145 has secured to it a collar 147 provided with a crank arm 148. At a distance above the flange 146*a*, shaft 145 rigidly carries a collar 149 and attached member 150. A coil spring 151 encircles shaft 145 between the flange 146*a* and the collar 149 and normally holds the shaft in raised position in which collar 147 abuts the bottom of flange 146a. Shafts 45 and 145 are independently movable axially but are so connected that the turning of shaft 45 will effect corresponding turning of shaft 145. Member 144, fixed to shaft 45, has a vertical leg 144a formed with a vertical slot into which the right end of the member 150, fixed to shaft 145, extends. Thus, when shaft 45 is turned, it turns shaft 145**.

The shaft 145 may be adjusted axially only while in its neutral rotative position. At that time, the member 150 is free to pass the concavely shaped free edge of the extension 141a of bracket 141 (also see Fig. 7). Attempted depression of shaft 145 when out of neutral position will be blocked by the engagement of the member 150 with the top of the extension 141a. If shaft 145 is depressed and then turned away from neutral position, the member 150 will be under a wing of extension 141a which will block return of the shaft to upper position.

The crank arm 148 of shaft 145 has a dependent pin 148a which, when shaft 145 is in up position, is clear above a cam piece 152 (also see Fig. 12). The cam piece is formed with a central cam slot 152a and is fastened to a link 153 slidably guided by rollers 251a on a bracket 251 secured to chassis 18. A lever 154, pivoted at 155, connects the link to the slidable contact carrier 156 of a slide type switch 157. In the forward position of link 153, shown in Fig. 12, the contact carrier 156 is positioned to condition the circuits for playback operation. The link will be moved to an alternative, rear position to adjust the contact carrier 156 to a position for conditioning the circuits for recording operation. A toggle device holds the link and connected parts firmly in adjusted position. The toggle device comprises a lever 158 pivoted at 158a to the bracket 251 and provided at one end with a pin 158b engaged by the link 153. The other end of lever 158 is connected by a spring 159 with the bracket 251. In Fig. 12, the lever 158 is holding link 153 in forward position. Rearward movement of the link will rock the lever 158 clockwise (as viewed in Fig. 12) and as soon as the lever moves beyond its central position with respect to the line of force of the spring 159, the spring will snap the lever to its extreme clockwise position. The lever 158 will thereby complete the rearward movement of the link 153. Forward movement of the link will return the lever 158 past its central position, whereupon the spring 159 will snap it to its shown position, causing the completion of the forward movement of the link.

Operation of link 153 to condition switch 157 for recording control is effected upon depression and turning of the shaft 145. When shaft 145 is depressed, pin 148a moves into cam slot 152a and turning of this shaft in either direction will cause pin 148a to act on the rear edge of the cam slot to displace link 153 rearwardly and the toggle device 158—159 is effective to complete the rearward movement of the link and to maintain it in this position in which it sets switch 157 for recording control. The switch 157 is in the same recording control position regardless of whether the shaft 45 is in clockwise position (Fig. 3) to cause tape feed to the right or is in counterclockwise position (Fig. 4) to cause tape feed to the left. When shaft 45 is turned to either feed position, it turns shaft 145 away from neutral position and if shaft 145 is depressed, it will cause actuation of link 153 to the rear to set switch 157 in recording control position, so that recording may be effected on the tape while moving in the direction selected by shaft 45. Upon return of shaft 45 to neutral, it returns shaft 145 to neutral position, the pin 148a thereupon acting on the front edge of cam slot 152a to move link 153 back to its forward position in which it sets the switch 157 to control playback operation. As soon as shaft 145 is back to neutral position, the spring 151 (Fig. 6) is effective to restore this shaft to its upper position.

Means are provided to open a switch 160 (see Figs. 3 and 15) for shutting off the motors when the tape is depleted from the pulled reel. The switch 160 is of the same general type as switches 100L and R (see Fig. 5*b*). The points 160*a* which are common to the circuits of motors 25L and R are normally open and the fulcrumed operating plate 160*b* of the switch is normally in clockwise position. The course of the tape is to the outside of a pair of pins 162L and R, respectively provided on the lower ends of a pair of levers 163 and 164. Levers 163 and 164 are behind the sub-frame plate 22 and pivoted on the reduced circular ends of the guide members 12L and 12R, which extend below the plate 22. A link 165 connects the levers at opposite sides of their pivots to constrain them to rockable movement in opposite directions. At its right end, the link 165 is provided with a roller 165*a* intruding into a slot 166 formed in the top leg of the U section of lever 58. When feed controller shaft 45 is in neutral position (Fig. 2), the central cam projection 166*a* of the front edge of the slot 166 is engaging the roller 165*a* for holding the link 165 to the right. In this position of link 165, lever 163 is in clockwise position with its roller 163*a* pressing on the right end of fulcrumed plate 160*b* so as to close the switch points 160*a* (see Fig. 3). Movement of the linkage 163—164—165 to alternate position is possible only when the shaft 45 has been turned to clockwise or counterclockwise position for initiating tape feed. The lever 58 will thereby be rocked to an inclined position in which the slot 166 frees the roller 165*a* for movement to the left. Such movement will occur when the tape is depleted from the pulled reel. Fig. 15 shows the condition in which the tape has been feeding to the left and is fully unwound from the right hand reel 3. The right end of the tape has been pulled taut and in so doing has pressed against pin 162R and displaced it to the left. Lever 164 has thereby been rocked clockwise and through link 165 has rocked lever 163 counterclockwise, relieving the pressure of roller 163*a* on the switch plate 160*b*; switch points 160*a* open and shut off the motors. If the tape feed were in the opposite direction, unwinding from the left hand reel, it would pull taut when depleted and press against the pin 162L to rock the lever 163 counterclockwise for allowing switch 160 to open and shut off the motors.

Return of the shaft 45 to neutral, tape stopping position rocks the lever 58 back to the position (Fig. 2) in which the cam projection 166*a* resets the linkage 163—164—165 to their positions for causing reclosure of switch 160.

It is to be noted that each end of the tape will be looped around its reel and closed. When the tape is depleted from a reel, the loop is pulled up and the tape end drawn taut and substantially in a line directed towards the center of the reel. Other suitable provision than a loop at each tape end may be made to enable the tape to be drawn taut to a central position with respect to the reel on which it reaches its end.

As shown in Fig. 16, head 4L will operate on one half of the tape width and head 4R on the other half. A sound track recorded on one half of the tape by head 4L during travel of the tape to the right may be played back by the head 4L if the reels remain in the same positions on the machine. If the reels are removed and replaced in inverted order, the tape half previously opposite the cores E and F of head 4L will be opposite the cores E and F of head 4R and may be played back by head 4F during tape travel to the left. Thus no attention need be paid to whether a reel of recorded tape has been in left or right hand position during the recording runs. It may be removed after the recording runs and later replaced in either position and its sound tracks will be played back in correct sequence. The advantage of the present machine, however, is that both halves of the tape width may be recorded on and played back without requiring removal of the tape reels and their reinsertion in reverse order.

*The circuits*

Fig. 17 diagrammatically shows the circuits. It has been explained that upon tape travel to the right, the left head 4L is to function, while upon tape travel to the left, the right head is to function. The coordinated selections of the direction of tape travel and the head to function are made by shaft 45, the selection of the direction of tape travel being effected by shaft 45 through the intervention of the cam plate 55 (Figs. 1 to 4) and the concomitant selections of the proper head to function being made by shaft 45 through the intervention of the switch 140 (also see Fig. 6). The internal structure of the heads is not the subject of the present invention. It is sufficient to state that each head includes an erase magnet on a core E (see also Fig. 16) and playback, record and bias coils on a core F. The bias coils are in series with the erase coil. When recording operation is to be effected, the previous signals on the track to receive the new signals must be erased. Current at a frequency in the order of 40,000 cycles will be applied to the serially connected erase and bias coils of the proper head 4L or 4R. The power of the erase magnet is quite strong, sufficient to wipe off the strongest notes on the tape track. It is to be noted that the core E of the erase magnet in head 4L is positioned to the left of the core F, so that upon travel of the tape to the right, the tape portions will first encounter the core E and then the core F of the head 4L. Similarly, the core E of head 4R is to the right of the core F of this head, so that on tape travel to the left, the tape portions will encounter the core E before the core F. Thus, if recording is called for with the tape traveling in a desired direction, the erase magnet of the selected head will erase the previously recorded signals on a portion of the tape track before this portion reaches the core F to receive new signals by operation of the record coils on this core.

The machine is normally conditioned for play-back operation, with switch 157 in the normal position shown in Figs. 12 and 17. As previously explained, if recording is to be effected, the shaft 145 (Fig. 6) is depressed and then shaft 45 turned according to the desired direction of tape travel. The shaft 145 is turned by shaft 45 and sets the switch 157 in the alternative, record position, by which is meant that the slide 156 is shifted to its alternative position. The slide 156 comprises an insulating carrier for contact bridges 157*a*, *b*, *c*, etc. shown in Fig. 17. The arrow in Fig. 17 indicates the direction in which the contact bridges are moved with the slide 156 upon the slide being shifted to alternative position. In record position of switch 157 it enables the record and erase-bias coils of whichever head is selected by switch 140 to operate.

Referring to Fig. 17, the several coils of each head are connected at a common side to ground. The other sides of the record, playback and erase-bias coils of the head 4L are connected to stationary contacts 2, 6 and 10, respectively, of switch 140. The record, playback, and erase-bias coils of head 4R are respectively wired to contacts 4, 8 and 12 of switch 140. In Fig. 17 switch 140 is shown as seen from the bottom and in the position to which it is adjusted by shaft 45 when the shaft is in counterclockwise position (Fig. 4) and is selecting tape travel to the left. Switch 140 in the shown position must, therefore, select elements of head 4R for operation. Thus, with switch 140 in shown position, the projections 140*c* of the three movable contact segments 140*b* are engaged with fixed contacts 4, 8, and 12 which are wired to the coils of head 4R, while the contacts 2, 6 and 10 are not engaged so that the coils of the head 4L are out of circuit. Should shaft 45 be returned to neutral, tape feed stopping position (Fig. 2), it will move contact segments 140*b* one step clockwise (Fig. 17) to a neutral position. In the neutral position of switch 140, the contact segments and their projections 140*c* will not engage any of the contacts 2, 6, 10 and 4, 8, 12, so that both heads 4L and 4R will be out of circuit. Should shaft 45 now be turned to clockwise position (Fig. 3) to select tape feed to the right, it will move contact segments 140*b* one step clockwise (as viewed in Fig. 17) from the neutral position, or two steps clockwise from shown position. Contact segments 140*b* will then have their projections 140*c* engaged with contacts 2, 6 and 10 so as to select the head 4L for operation.

Assume that power has been applied to the circuits and that switches 140 and 157 are in shown position. The playback coils of the right head 4R will then be operated for causing reproduction of the signals on one half of the tape width, with the tape traveling to the left. The circuit of the playback coils of the head 4R will be established from ground, through these coils, to contact 8 of switch 140, the projection 140*c* of a contact segment 140*b*, the contact 5 engaged by this segment, thence to contact 8 of switch 157, a bridge 157*a* fixed to slidable carrier 156 (Fig. 12), then to contact 7, the contact 5 wired to contact 7, another bridge 157*b* to contact 4, and thence to the amplifier. This amplifier may be any suitable microphone and magnetic pick-up amplifier and is therefore shown here diagrammatically in box form.

In the foregoing manner, with switches 140 and 157 in shown positions, the playback coils of the head 4R are connected to the amplifier to cause reproduction of the sound track on the top half of the tape width of the tape traveling to the left.

If switch 140 were in a position two steps clockwise from shown position, as would be the case were tape travel to the right selected, then the playback coils of head 4L would be connected with the amplifier. The circuit of these coils would extend via contact 6 of switch 140 and a bridging segment 140*b* to contact 5 of this switch and thence as on the previously traced circuit.

When recording is to take place, switch 157 is shifted, in the manner described before, to its alternative position, in which its contact bridges are to the right of shown position. In alternative position of switch 157, bridge 157*a* departs from contact 7, breaking the connection of the playback coils to the amplifier. Further, in the alternative record position of switch 157, an oscillator O is rendered operative to apply its output to the erase-bias coils of the head selected by switch 140. Also, the record coils of the selected head are connected to the amplifier. The oscillator O includes a tube 200, of type 6K6, the cathode of which is wired to contact 13 of switch 157. In playback position of the switch, the contact 13 is open. When switch 157 is in record position, a bridge 157*c* connects contact 13 to grounded contact 12, thereby applying ground to the cathode of tube 200. The anode of tube 200 is connected through the primary oscillator coil L1 to the amplifier to receive potential therefrom. The secondary oscillator coil L2 is connected at one side to grounded contact 9 of switch 157. The other side of coil L2 is connected to contact 11 of switch 157. When the switch 157 is in alternate, record control position, a bridge 157*d* connects contact 11 to contact 10 of the switch. Contact 10 of switch 157 is wired to contact 9 of switch 140. With switch 140 in shown position, its contact 9 is engaged with a contact segment 140*b*, the projection 140*c* of which is on contact 12. Contact 12 is wired to the erase-bias coils of the right head 4R. Thus, in the record control position of switch 157 and in the shown position of switch 140, the oscillator coil L2 is in circuit with the erase-bias coils of the right head. The erase magnet will thereby be effective to erase the record previously made on a half of the tape width as the tape feeds to the left.

In shown position of switch 140, the record coils of the right head are connected via contact 4, one of the contactors 140b and contact 1 to an equalization switch circuit 205. The switch 205a of this circuit is adjusted by the shaft 15a (see Fig. 9) of the speed selecting device 15 and is shown in Fig. 17 in the position which it takes when device 15 is in 7½ inches per second tape speed position. The switch circuit 205 leads to contact 25 of switch 157. In shown playback position of switch 157, the contact 25 is connected by bridge 157e to grounded contact 24. When the switch 157 is in alternate, record position, the bridge 157e is off the contact 24 and is bridging contacts 25 and 26. Contact 26 is connected to the amplifier. Thus, in the record position of the switch 157 and the shown position of switch 140, the record coils of the right head 4R are in closed circuit with the amplifier.

Further, in the record position of the switch 157, a bridge 157f is displaced to the right of the shown position and is bridging contacts 2 and 3, thus connecting the microphone socket 206 to the amplifier.

The selection of the erase-bias and the record coils of head 4R have been explained above. If switch 140 were in a position two steps clockwise from shown position, as is the case when tape feed to right is selected, then the erase-bias coils of head 4L would be connected via contact 10 of switch 140 and a contact segment 140b to contact 9 and thence to switch 157. Also, the record coils of head 4L would be connected via contact 2 of switch 140, a segment 140b and contact 1, through the equalization switch circuit 205 to switch 157. With switch 157 adjusted to record position, the erase-bias and record coils of the head 4L would then function.

Power for the circuits is provided from a 60 cycle supply at 117 volts, more or less, upon closure of switch 6a (operated by knob 6, see Fig. 1) and with switch points 160a (also see Figs. 3 and 15) closed. Switch 160a remains closed as long as the tape is not exhausted from the pulled reel, as previously explained. When the tape is exhausted from the pulled reel, switch points 160a open and disconnect the amplifier and the motors 25L and 25R from the power supply.

As described before, motor 25L serves as a feed motor and motor 25R as a take-up motor when tape feed is to the right, the functions of the motors being reversed upon tape feed to the left. It has also been explained that when tape feed to the right is selected, the switch 100R (see Figs. 3 and 5b) is transferred while if tape feed to the left is selected then the switch 100L is transferred. Fig. 17 shows the switches 100L and R as conditioned when tape travel to the left is selected, switch 100L being transferred and switch 100R being normal. Motor 25R is then to serve at full power as the feed motor and its circuit extends from one side of the power supply via switches 6a and 160a, both assumed closed, through motor 25R and via switch 100R, in normal condition, to the opposite side of the supply. The motor 25L is to serve as the tape take-up motor at reduced power and its circuit extends from one side of the supply via switches 6a and 160a, through the motor 25L, thence via switch 100L, in transferred condition, and via a resistor R34, to the opposite side of the supply. The resistor R34 reduces the power of the motor 25L so that it will act as a stall torque motor in driving the left hand reel for taking up the tape being fed to the left (see Fig. 4). Were tape feed to the left selected, the switches 100L and R would be reversed from the shown positions, and resistor R34 would be in the circuit of motor 25R instead of in the circuit of motor 25L. When rewind operation is desired, then the take-up motor is to operate at full power. In rewind position of the cam plate 55 (see Fig. 5), both switches 100L and R are in normal condition and resistor R34 is not in the circuit of either motor.

While the invention has been shown and described in connection with the illustrated embodiment, it is to be understood that variations and modifications of the form and details of the illustrated device may be made without departing from the spirit of the invention. It is, therefore, intended to be limited only in accordance with the following claims.

What is claimed is:

1. A reversibly operable winding mechanism for feeding record tape comprising a pair of rotatably mounted reels, a capstan including a shiftable idler means intermediate said reels, separate motive means for driving each of said reels, transmission means shiftable in one direction to couple one of said motive means to said capstan, and the other of said motive means to one of said reels, and also shiftable in an opposite direction to couple said other motive means to said capstan, and said first mentioned motive means to the other of said reels for effecting tape feed between said reels in opposite directions; actuating means operable for shifting said idler means into tape feeding relation with said capstan; a slidable cam plate adapted for actuating said transmission means; and a uni-control member pivotally connected to said actuating means and said cam plate, settable in either of two positions of adjustment from a neutral position for shifting said idler means into operative position, and simultaneously actuating said cam plate whereby to shift said transmission means to drive said capstan and either of said reels in accordance with a selected direction of tape feed.

2. A reversibly operable winding mechanism for record tape comprising a pair of simultaneously energizable motors, a pair of pivotally mounted carriers each adapted for movement relative to one of said motors, a reel including a reel chuck therefor journaled on each of said carriers, a capstan including a shiftable idler means, a pair of selectively shiftable transmission members, a slidable cam plate adapted for simultaneously shifting one of said transmission members into driving engagement with one of said motors and said capstan, and one of said reel chucks into driving engagement with the other of said motors, actuating means operable for shifting said idler means into tape feeding relation with said capstan, and a uni-control member pivotally connected to said cam plate and said actuating means settable in either of two positions of adjustment for shifting said idler means, either of said transmission members and either of said reel chucks for effecting tape feed between said reels alternatively in opposite directions.

3. In a reversibly operable winding mechanism for feeding record tape the combination of a pair of reels each rotatably mounted on a shiftable carrier, a capstan including a shiftable roller and actuating means operable for shifting said roller into and out of tape feeding relation with said capstan, a pair of simultaneously operable motors for driving one or the other of said reels, a pair of transmission members separately shiftable to couple one or the other of said motors to said capstan, an elongated cam plate mounted for endwise movement in opposite directions, linkage means connecting said reel carriers and said transmission members to said cam plate, and a uni-control member movably connected to said actuating means and said cam plate settable in either of two positions of adjustment for shifting said roller and said cam plate to effect tape feed between said reels alternatively in opposite directions.

4. In a reversibly operable winding mechanism for feeding record tape the combination of a pair of simultaneously energizable motors, a pair of pivotally mounted carriers each adapted to be moved relative to one of said motors, a bearing drum including an integral reel chuck detachably mounting a reel thereon for rotation therewith journaled on each of said carriers, a capstan including a shiftable idler means, a shiftable transmission means disposed between said motors, capstan and reel chucks, a slidable cam plate adapted for simultaneously shifting said transmission means into driving engagement with one of said motors and said capstan, and one of said bearing drums into driving engagement with the other of said motors, actuating means operable for shifting said idler means into tape feeding relation with said capstan, and a uni-control member pivotally connected to said cam plate and said actuating means settable in either of two positions of adjustment for shifting said idler means, said transmission means and either of said reel chucks for effecting tape feed between said reels alternatively in opposite directions.

5. In a reversibly operable winding mechanism for feeding record tape the combination of a pair of simultaneously energizable motors each presenting an upstanding drive shaft, a pair of pivotally mounted carriers each having a bearing drum including an integral reel chuck journaled thereon, a reel detachably mounted on each of said chucks for rotation therewith, said carriers being each adapted to be shifted relative to one of said motors for coupling one of said bearing drums to either of said motor shafts, a capstan including a shiftable idler and actuating means operable for shifting said idler into and out of tape feeding relation with said capstan, transmission means selectively shiftable between either of said motor shafts and said capstan, and an elongated cam plate mounted for endwise movement in opposite directions adapted for selectively shifting either of said bearing drums and said transmission means into operative position, linkage means operatively connecting said cam plate with said carriers and said transmission means, and a uni-control member movably connected to said cam plate and said actuating means settable in either one of two positions of adjustment for shifting said idler, either one of said bearing drums and said transmission means to effect tape feed between said reels alternatively in opposite directions.

6. In a reversibly operable winding mechanism for feeding record tape the combination of a pair of simultaneously energizable motors each presenting an upstanding drive shaft, a pair of pivotally mounted carriers each having a bearing drum including an integral reel chuck journaled thereon, a tape reel detachably mounted on each of said chucks for rotation therewith, said carriers being each adapted to be shifted relative to one of said motors for coupling one of said bearing drums to either of said motor shafts, a capstan including a shiftable idler and actuating means operable for shifting said idler into and out of tape feeding relation with said capstan, a pair of idler wheels each journaled on a hinged member separately shiftable between said motor shafts and said capstan, an elongated cam plate mounted for endwise movement in opposite directions adapted for selectively shifting either of said bearing drums and either of said idler wheels into operative position, linkage means operatively connecting said cam plate with said carriers and said hinged members, and a uni-control member movably connected to said cam plate and said idler actuating means settable in either one of two positions of adjustment to shift said idler, either of said bearing drums and either of said idler wheels for effecting tape feed between said reels alternatively in opposite directions.

7. In a reversibly operable winding mechanism for feedng record tape the combination of a pair of simultaneously operable motors each presenting an upstanding drive shaft, a pair of pivotally mounted carriers each having a bearing drum including an integral reel chuck rotatably mounted thereon, a tape reel detachably mounted on each of said chucks for rotation therewith, said carriers being each adapted to be shifted relative to one of said motors for coupling one of said bearing drums to either of said motor shafts, a capstan including a shiftable roller and cam and lever means operable for shifting said roller into and out of tape feeding relation with said capstan, a pair of friction drive idler wheels each journaled on an arm hingedly connected to a supporting bracket mounted on a fixed upstanding stub shaft whereby said drive idler wheels are separately shiftable between said motor shafts and said capstan, an elongated cam plate slidably mounted for endwise movement in opposite directions, linkage means operable between said cam plate, said pivoted carriers and said hingedly connected arms for shifting either of said reel mounting drums and either of said friction wheels into and out of operative position, and a uni-control member detachably connected to said cam and lever means and pivotally connected to said cam plate settable in either of one of two positions of angular adjustment from a neutral position for simultaneously shifting said roller, either of said reel mounting drums and either of said friction wheels for effecting tape feed between said reels alternatively in opposite directions.

8. The invention according to claim 7, and in which a notched plate is secured to said uni-control member for coaction with a spring biased roller detent pivotally mounted adjacent thereto whereby said control member is yieldably indexed in either one of said two positions of angular adjustment and in said neutral position.

9. The invention according to claim 8, and in which a power circuit for said motors includes a resistance means adapted for selective insertion in series with either of said motors, a pair of switches for coupling said resistance with either of said motors disposed to one side of said cam plate, and dual actuating means secured to said cam plate for operating either of said switches upon setting of said unicontrol member in either of said two positions whereby to substantially reduce the torque of either of said motors during alternative tape feed by said capstan in either direction.

10. The invention according to claim 9, and in which the extent of movement of said cam plate in either direction, in response to the setting of said unicontrol member in either of said two positions, is limited by the extent of movement of the cam and lever means for shifting said roller whereby the switch actuating means on said cam plate maintain either of said resistance inserting switches in closed position during tape feed by said capstan in either direction.

11. The invention according to claim 10, and in which the uni-control member is adapted to be depressed axially to detach said cam and lever means therefrom whereby to render said roller inactive during the setting of said unicontrol member in either of said two positions, and said cam plate movable to its maximum extent in either direction to carry said switch actuating means beyond said resistance switches whereby said motors are operable at maximum torque for a tape reeling operation from one reel to the other.

12. The invention according to claim 11, and in which a spring biased brake member is pivotally mounted on each of said drum carriers in coactable relation with each bearing drum, and linkage means connected to each of said brake members controlled by said cam plate whereby the brake member corresponding to the pay-off reel drum carrier is moved into positive engagement with the bearing drum of said pay-off reel carrier upon setting of said unicontrol member in neutral position.

13. The invention according to claim 12, and in which said motor shafts are each provided with a pulley adjacent the free end portion thereof, and said friction wheel supporting bracket spring biased and provided with a laterally extending pin coacting with a cam means adapted for manual adjustment to raise and lower said friction wheels into the plane of rotation of the free end portion of said shafts or said pulleys whereby to drive said capstan and either one of said drums at one or the other of two different speeds.

References Cited in the file of this patent

UNITED STATES PATENTS

| | | |
|---|---|---|
| 2,467,507 | Stone | Apr. 19, 1949 |
| 2,504,587 | Rey | Apr. 18, 1950 |
| 2,535,478 | Arndt, Jr., et al. | Dec. 26, 1950 |
| 2,538,893 | Begun | Jan. 23, 1951 |
| 2,540,299 | Shoup et al. | Feb. 6, 1951 |
| 2,542,590 | Stone | Feb. 20, 1951 |
| 2,542,917 | Fischer | Feb. 20, 1951 |
| 2,555,643 | Harrison | June 5, 1951 |
| 2,563,545 | Moreland et al. | Aug. 7, 1951 |
| 2,567,158 | Thad | Sept. 4, 191 |
| 2,571,807 | Woodhouse et al. | Oct. 16, 1951 |
| 2,620,404 | Pond | Dec. 2, 1952 |